United States Patent
Visser et al.

(10) Patent No.: US 10,332,520 B2
(45) Date of Patent: Jun. 25, 2019

(54) ENHANCED SPEECH GENERATION

(71) Applicant: QUALCOMM Incorporated, San Diego, CA (US)

(72) Inventors: Erik Visser, San Diego, CA (US); Shuhua Zhang, San Diego, CA (US); Lae-Hoon Kim, San Diego, CA (US); Yinyi Guo, San Diego, CA (US); Sunkuk Moon, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 81 days.

(21) Appl. No.: 15/430,791

(22) Filed: Feb. 13, 2017

(65) Prior Publication Data

US 2018/0233127 A1 Aug. 16, 2018

(51) Int. Cl.
| | |
|---|---|
| *G10L 15/26* | (2006.01) |
| *G10L 25/48* | (2013.01) |
| *G10L 13/047* | (2013.01) |
| *G10L 21/00* | (2013.01) |
| G10L 21/003 | (2013.01) |

(52) U.S. Cl.
CPC ............ *G10L 15/26* (2013.01); *G10L 13/047* (2013.01); *G10L 21/00* (2013.01); *G10L 25/48* (2013.01); *G10L 21/003* (2013.01)

(58) Field of Classification Search
CPC ....... G10L 13/027; G10L 15/26; G10L 25/63; G10L 25/21; G10L 25/78; G10L 13/047; G10L 25/90; G10L 15/30; G10L 15/22; G10L 2015/223
USPC ......................................................... 704/235
See application file for complete search history.

(56) References Cited

U.S. PATENT DOCUMENTS

| | | | |
|---|---|---|---|
| 5,960,389 A | 9/1999 | Jarvinen et al. | |
| 6,026,360 A | 2/2000 | Ono | |
| 6,078,884 A | 6/2000 | Downey | |
| 7,406,417 B1* | 7/2008 | Hain | G10L 13/08 704/260 |
| 2002/0111794 A1* | 8/2002 | Yamamoto | G10L 13/08 704/200 |
| 2003/0216912 A1 | 11/2003 | Chino | |
| 2007/0225980 A1 | 9/2007 | Sumita | |
| 2008/0065381 A1 | 3/2008 | Matsumoto | |
| 2008/0255827 A1 | 10/2008 | Nurminen et al. | |

(Continued)

FOREIGN PATENT DOCUMENTS

WO 0072305 A2 11/2000

OTHER PUBLICATIONS

Shuang Z., et al., "Voice Conversion by Combining Frequency Warping with Unit Selection," IEEE International Conference on Acoustics, Speech and Signal Processing (ICASSP' 08), 2008, pp. 4661-4664.

(Continued)

*Primary Examiner* — Bharatkumar S Shah
(74) *Attorney, Agent, or Firm* — Toler Law Group, P.C.

(57) ABSTRACT

In a particular aspect, an apparatus includes an audio sensor configured to receive an input audio signal. The apparatus also includes speech generative circuitry configured to generate a synthesized audio signal based at least partly on automatic speech recognition (ASR) data associated with the input audio signal and based on one or more parameters indicative of state information associated with the input audio signal.

30 Claims, 13 Drawing Sheets

(56) References Cited

U.S. PATENT DOCUMENTS

| | | |
|---|---|---|
| 2011/0165912 A1 | 7/2011 | Wang et al. |
| 2013/0218566 A1 | 8/2013 | Qian et al. |
| 2014/0039895 A1 | 2/2014 | Aravamudan et al. |
| 2016/0064008 A1 | 3/2016 | Graham |
| 2016/0086618 A1* | 3/2016 | Neoran .................. H04M 9/08 704/205 |
| 2016/0171974 A1 | 6/2016 | Hannun et al. |
| 2016/0329043 A1* | 11/2016 | Kim ........................ G10L 13/10 |

OTHER PUBLICATIONS

Stenman M., "Automatic Speech Recognition," An evaluation of Google Speech, Spring, 2015, 37 pages.

* cited by examiner

US 10,332,520 B2

ENHANCED SPEECH GENERATION

I. FIELD

The present disclosure is generally related to speech processing.

II. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Smart speakers allow a user to issue voice commands to be performed by the smart speakers. For example, the user may speak a query to cause a smart speaker to perform a search based on the query. The smart speaker may convert a result of the query into an audio output (e.g., synthesized speech) using text-to-speech (TTS) conversion. The synthesized speech may sound unnatural or different from the user's normal speech, which can negatively impact the user's experience. Additionally, the smart speaker may have difficulty identifying the user's speech due to poor quality or low intelligibility of the received speech.

III. SUMMARY

In a particular aspect, an apparatus includes an audio sensor configured to receive an input audio signal. The apparatus also includes speech generative circuitry configured to generate a synthesized audio signal based at least partly on automatic speech recognition (ASR) data associated with the input audio signal and based on one or more parameters indicative of state information associated with the input audio signal.

In another particular aspect, a method includes receiving an input audio signal at a device. The method also includes obtaining a synthesized audio signal based at least partly on automatic speech recognition (ASR) data associated with the input audio signal and based on one or more parameters indicative of state information associated with the input audio signal.

In another particular aspect, an apparatus includes means for receiving an input audio signal. The apparatus also includes means for generating a synthesized audio signal based at least partly on automatic speech recognition (ASR) data associated with the input audio signal and based on one or more parameters indicative of state information associated with the input audio signal.

In another particular aspect, a non-transitory computer readable medium includes instructions that, when executed by a processor, cause the processor to perform operations including receiving an input audio signal at a device. The operations also include obtaining a synthesized audio signal based at least partly on automatic speech recognition (ASR) data associated with the input audio signal and based on one or more parameters indicative of state information associated with the input audio signal.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
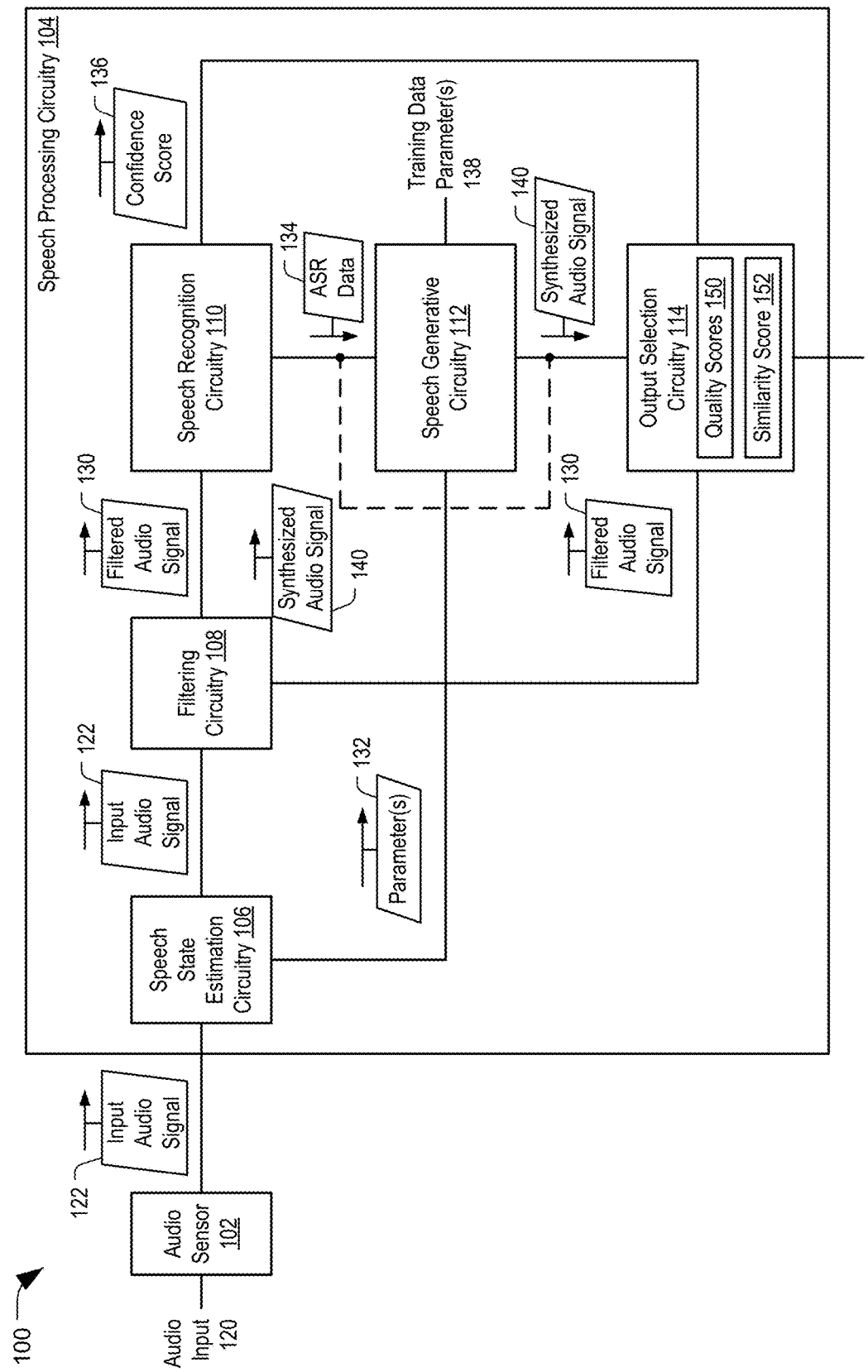
FIG. 1 is a block diagram of a particular illustrative aspect of a system that generates an enhanced speech signal.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

The present disclosure describes systems, devices, and methods for providing "enhanced speech" to a listener. As used herein, enhanced speech refers to input speech that has been filtered to generate filtered speech or to synthesized speech that is synthesized based on the input speech. The synthesized speech may sound more like the speech of a person associated with the input speech than other synthesized speech. The enhanced speech may also more closely represent the emotional state of the person at a particular time and the context of the speech. The enhanced speech may be played back to the person or provided to a listener. For example, the enhanced speech may be provided as an audio message to another device. The improved quality of the enhanced speech may improve user experience for the person speaking, a different listener, or both.

In a particular aspect, a device includes a sound sensor, such as a microphone, that is configured to receive an input audio signal that includes speech. Speech recognition circuitry included in the device may be configured to perform an automatic speech recognition (ASR) operation based on the input audio signal to generate ASR data based on the input audio signal. For example, the speech recognition circuitry may generate ASR data that represents a transcript of the speech that is represented by the input audio signal. Speech state estimation circuitry within the device may be configured to estimate one or more parameters that indicate state information associated with the input audio signal. For example, the one or more parameters may include speech state parameters, temporal parameters, emotional cue parameters, pitch parameters, or a combination thereof, as non-limiting examples. In at least one implementation, the speech state estimation circuitry performs model based, non-linear speech analysis using one or more neural networks to estimate the state information and the one or more parameters.

Speech generative circuitry within the device may be configured to generate a synthesized audio signal based on the ASR data and the one or more parameters. For example, the speech generative circuitry may perform one or more speech generation operations based on the ASR data, and the synthesized speech generated by the one or more speech generation operations may be modified based on the one or more parameters to more closely match the person's tone of voice, emotion level, pauses, vocal modulations, and other speech characteristics.

Because the one or more parameters are generated based on the input audio signal, the synthesized speech may sound more like natural speech of the person (e.g., a user), including more closely matching the emotion of the person when speaking and the context of the speech (e.g., the speech as a whole phrase, sentence, etc.) than synthesized speech that is generated using other methods. For example, because the one or more parameters are based on an analysis of the particular speech in context (e.g., an analysis of characteristics of a current utterance by the person), the synthesized speech may have characteristics (e.g., tone, vocal modulations, pauses, emphasis, etc.) that more closely match the characteristics of the particular words or phrases that are spoken at a particular time. Thus, the synthesized speech (e.g., the enhanced speech) may sound more similar to conversational speech of the person than synthesized speech that is generated by other methods. Improving the similarity of synthesized speech to human speech may improve user experience.

Referring to FIG. 1, a particular illustrative aspect of a system that generates an enhanced speech signal is shown and generally designated 100. The system 100 includes an audio sensor 102 and speech processing circuitry 104. Although the audio sensor 102 is illustrated as being separate from the speech processing circuitry 104, in other implementations, the audio sensor 102 may be included in the speech processing circuitry 104. Although the system 100 is illustrated as included the audio sensor 102 and the speech processing circuitry 104, in other implementations the system 100 may include more components or fewer components than illustrated in FIG. 1. The system 100 may be included in a device, such as a mobile device, a mobile phone, a laptop computer, a tablet computer, a media device, a smart appliance, a vehicle, or other another device. In other implementations, the system 100 may be included in a base station.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

The audio sensor 102 may be configured to receive an audio input and to generate an input audio signal 122 based on the audio input 120. For example, the audio sensor 102 may receive speech (e.g., the audio input 120) from a person speaking, such as a user, and the audio sensor 102 may generate the input audio signal 122 based on the speech. The audio sensor 102 may include a microphone or other audio capture device configured to receive an audio input 120 and to generate the input audio signal 122. In some implementations, the audio sensor 102 is configured to generate a digital signal based on an input analog signal. For example, the audio sensor 102 may sample the audio input 120 and generate a stream of audio packets (e.g., the input audio signal 122) based on the audio input 120. The audio input 120 may be noisy or include background noise in addition to speech.

The speech processing circuitry 104 may be configured to generate an enhanced speech signal 124 (e.g., an audio output signal) based on the input audio signal 122, as further described herein. The enhanced speech signal 124 may sound more like speech of a person (e.g., a user) associated with the input audio signal 122 than synthesized speech generated using other techniques. The speech processing circuitry 104 may be configured to generate the enhanced speech signal 124 by performing one or more automatic speech recognition (ASR) operations, one or more speech generation operations, or a combination thereof, as further described herein.

The speech processing circuitry 104 includes speech state estimation circuitry 106, filtering circuitry 108, speech recognition circuitry 110, speech generative circuitry 112, and output selection circuitry 114. In other implementations, the speech processing circuitry 104 may include more components or fewer components than illustrated in FIG. 1. Additionally or alternatively, two or more of the components 104-112 may be integrated within a single component, or one component may perform the operations of two or more components.

The speech state estimation circuitry 106 may be configured to generate one or more parameters 132 based on at least a portion of the input audio signal 122. For example, the speech state estimation circuitry 106 may be configured to analyze a portion of the input audio signal 122 to estimate state information (e.g., estimated speech states) associated with one or more portions of the input audio signal. The estimated speech states may include temporal states, emotional states, speech states, or other state information. The one or more parameters 132 may be indicative of the state information (e.g., the estimated speech states). For example, the one or more parameters may include speech state parameters (e.g., voice state parameters), temporal parameters, emotional cue parameters indicative of emotional levels associated with input speech, pitch parameters indicative of pitch associated with input speech, prosody parameters, energy contour parameters, other parameters, or a combination thereof.

The speech state parameters may indicate (e.g., may be indicative of) whether one or more portions of the input audio signal 122 correspond to speech or non-speech (e.g., background audio, music, or noise, as non-limiting examples). Additionally, the speech state parameters may be indicative of a signal to noise ratio (SNR), isolated noise peaks, pitch parameters, formant, prosody, other state information, or a combination thereof. The temporal parameters may indicate a tempo associated with speech represented by the input audio signal 122, envelope information (time, frequency, etc.), energy levels (e.g., energy contours) associated with the speech, stressed or accented sounds (e.g., words, phrases, or parts of words or phrases) associated with the speech, other temporal parameters, or a combination thereof. The emotional cue parameters may indicate the emotion of the person associated with a particular sound, word, or phrase, modulation levels associated with the speech, intonations associated with the speech, other emotion parameters, or a combination thereof.

In a particular implementation, the speech state estimation circuitry 106 is configured to perform model based, non-linear analysis on the input audio signal 122 to determine the one or more parameters 132. For example, the speech state estimation circuitry 106 may include a deep neural network (DNN), a convolutional network, or both, configured to estimate speech state information and the one or more parameters 132. The estimated speech state information may include information that indicates the SNR, isolated noise peaks, pitch, formant, prosody, envelope information (e.g., time, frequency, etc.), other information, or a combination thereof. Additional details of the one or more parameters 132 are described with reference to FIGS. 2 and 6.

Because the one or more parameters 132 (and the estimated speech states) are determined based on the actual words or phrases spoken by a user, the one or more parameters 132 may enable generation of synthesized speech having characteristics that more closely match (e.g., are more similar to) characteristics of the person's speech at a particular time and in context, as compared to synthesized speech generated by other systems. To illustrate, other speech generation systems may generate speech that sounds robotic. Additionally, other speech generation systems may generate synthesized speech based on predetermined information. Thus, the synthesized speech generated by other systems does not closely match the emotion of the user and the characteristics of the speech as spoken at a particular time.

To illustrate, synthesized speech generated by other systems may lack the conversational nature and emotion of particular speech. As an example, other systems may generate synthesized speech based on the phrase "I love you", and the synthesized speech may have minimal emotion and may sound the same regardless of the context of the speech. However, when the user speaks the phrase "I love you" in conversation, the speech may sound different due to different speaking speed, different pitch, different emotional cues (e.g., happiness, passion, sarcasm, etc.). Because the one or more parameters 132 are based on estimated speech states associated with particular spoken words or phrases in context and at a particular time, synthetic speech that is generated based on the one or more parameters 132 may sound like conversational speech and may have characteristics that are temporally aligned with the characteristics of particular speech at a particular time.

The speech processing circuitry 104 may include the filtering circuitry 108. The filtering circuitry 108 may be configured to generate a filtered audio signal 130 based on the input audio signal 122. For example, the filtering circuitry 108 may be configured to perform model-based audio filtering based on the input audio signal 122 to generate the filtered audio signal 130. The filtering circuitry 108 may be configured to reduce (or eliminate) noise, reverberation, echo, or other undesired characteristics from the input audio signal 122.

In a particular implementation, the filtering circuitry 108 includes a long short-term memory (LSTM) recurrent neural network (RNN) configured to perform speech state tracking to track speech, non-speech, onsets, offsets, and silence within the input audio signal 122. Additionally or alternatively, the filtering circuitry 108 includes a DNN, a convolutional network, or both, configured to analyze noise and estimate speech state information and parameters based on information such as SNR, isolated noise peaks, pitch, formant, prosody, envelope information (e.g., time, frequency, etc.), other information, or a combination thereof. The filtering circuitry 108 may also be configured to perform noise reduction filtering and speech reconstruction based on training data associated with human speech (e.g., one or more users' speech), artificial speech (e.g., based on one or more speech corpuses or speech databases), various noises, randomization, data augmentation, or a combination thereof. Additionally or alternatively, the filtering circuitry 108 may perform direct speech processing and filter gain estimation on the input audio signal 122 using enhanced conversion models (ECNS) to generate the filtered audio signal 130.

In another particular implementation, the filtering circuitry 108 may include a single microphone (mic) noise suppression system that uses non-negative matrix factorization (NMF) to filter audio signals. To illustrate, the filtering circuitry 108 may be configured to perform single mic pre-processing operations, such as fluence single mic noise suppression and pitch prediction, DNN or RNN/LSTM based speech and noise filter gain prediction, or both. The filtering circuitry 108 may also be configured to estimate (e.g., predict) a pitch associated with the input audio signal 122 and to select a speech dictionary that corresponds to the estimated pitch. The filtering circuitry 108 may be further configured to perform NMF based de-noising operations based on the selected speech dictionary and a real-time noise reference generated during the single mic pre-processing operations. To illustrate, the NMF based de-noising operations may include NMF based Wiener filtering to remove non-stationary noise residue, NMF based speech restoration to maintain clean speech envelope, refining speech harmonic structure, or a combination thereof.

In a particular implementation, the speech state estimation circuitry 106 and the filtering circuitry 108 are integrated within a single circuitry. For example, the filtering circuitry 108 may include the speech state estimation circuitry 106 or perform the functions of the speech state estimation circuitry 106. In this implementation, the one or more parameters 132 may be generated during performance of one or more filtering operations. In an alternate implementation, the speech processing circuitry 104 does not include the filtering circuitry 108, and the additional processing described herein is performed on the input audio signal 122 (instead of the filtered audio signal 130).

The speech recognition circuitry 110 may be configured to receive the filtered audio signal 130 from the filtering circuitry 108 and to perform one or more ASR operations based on the filtered audio signal 130 (or the input audio signal 122) to generate ASR data 134. The ASR data 134 may indicate a transcript of input speech associated with the filtered audio signal 130 (or the input audio signal 122). For example, the speech recognition circuitry 110 may be configured to recognize words or phrases included in speech within the filtered audio signal 130 (or the input audio signal 122), and the speech recognition circuitry 110 may generate a transcript (e.g., text) of the words or phrases. The speech recognition circuitry 110 may be configured to determine the ASR data 134 based on speech conversion data that includes one or more speech corpus, one or more speech-to-text databases, training data, other information, or a combination thereof. In a particular implementation, the speech conversion data may be stored at a memory included within or coupled to the speech processing circuitry 104. Alternatively, the speech conversion data may be accessible from one or more other devices via a network (e.g., the speech conversion data may be stored in the cloud).

The speech recognition circuitry 110 may also be configured to determine a confidence score 136 based on a likelihood that the transcript of the recognized speech (e.g., the ASR data 134) accurately matches the user's speech. To illustrate, the speech recognition circuitry 110 may be configured to determine a confidence score associated with the ASR data 134 by comparing one or more portions of the filtered audio signal 130 (or the input audio signal 122) to audio data, such as training data or audio data stored in a database, in order to determine a similarity between the portions of the filtered audio signal 130 (or the input audio signal 122) and the audio data. A high similarity corresponds to a high value of the confidence score 136, and a low similarity corresponds to a low value of the confidence score 136. The comparisons may be performed by word, by phrase, by sound feature, and may represent a total confidence, an average confidence, or some other confidence value. The confidence score 136 may be used by the output selection circuitry 114, as further described herein.

The speech generative circuitry 112 may be configured to receive the ASR data 134 from the speech recognition circuitry 110 and to receive the one or more parameters 132 from the speech state estimation circuitry 106. The speech generative circuitry 112 may be configured to generate a synthesized audio signal 140 based on the ASR data 134 and the one or more parameters 132. For example, the speech generative circuitry 112 may include one or more neural networks (or other networks) that are configured to generate the synthesized audio signal 140 based on the ASR data 134 and the one or more parameters 132, as further described with reference to FIGS. 5 and 6. In a particular implementation, the speech generative circuitry 112 includes text conversion circuitry configured to perform one or more text-to-speech (TTS) operations based on the ASR data 134 in order to generate the synthesized audio signal 140. Because the synthesized audio signal 140 is generated based on the one or more parameters 132, the synthesized audio signal 140 may include synthesized speech that more closely matches particular speech (e.g., in tempo, pitch, modulation, envelope, energy, etc.) at a particular time, as compared to other synthesized speech.

In a particular implementation, the speech generative circuitry 112 is further configured to generate the synthesized audio signal 140 based on a set of training data parameters 138. The set of training data parameters 138 are distinct from the one or more parameters 132. The set of training data parameters 138 may be based on training data (e.g., previous user speech), and the training data parameters 138 may be stored at a memory or at one or more devices communicatively coupled to the system 100 via a network (e.g., one or more devices in the cloud or via one or more cloud-based storage operations). Generating the synthesized audio signal 140 based on the one or more parameters 132 and the training data parameters 138 may be more robust than generating the synthesized audio signal 140 based on the one or more parameters 132 and not the set of training data parameters 138.

In some implementations, the synthesized audio signal 140 is provided as feedback to the speech generative circuitry 112. For example, the speech generative circuitry 112 may be configured to generate the synthesized audio signal 140 based on the ASR data 134, the one or more parameters 132, and one or more previous synthesized audio frames (e.g., the synthesized audio signal 140). To illustrate, the speech generative circuitry 112 may determine a modification to apply to one or more previous synthesized audio frames to generate a new frame of the synthesized audio signal 140, and the modification may be determined based on the ASR data 134 and the one or more parameters 132.

The output selection circuitry 114 may be configured to receive the synthesized audio signal 140 from the speech generative circuitry 112 and to receive the filtered audio signal 130 from the filtering circuitry 108. The output selection circuitry 114 may be configured to select an audio signal from the filtered audio signal 130 and the synthesized audio signal 140, and the output selection circuitry 114 may be configured to generate an enhanced speech signal 124 based on the selected audio signal. For example, the output selection circuitry 114 may select either the filtered audio signal 130 or the synthesized audio signal 140 as the enhanced speech signal 124, or the output selection circuitry 114 may be configured to perform one or more post-processing operations on the selected audio signal to generate the enhanced speech signal 124.

The selection may be based at least in part on the confidence score 136 associated with associated with the ASR data 134. For example, if the confidence score 136 is below a confidence threshold, the enhanced speech signal 124 may be generated based on the filtered audio signal 130. Alternatively, if the confidence score 136 exceeds the confidence threshold, the enhanced speech signal 124 may be generated based on the synthesized audio signal 140. The selection may also be based on a similarity score 152 that indicates a similarity between the filtered audio signal 130 and the synthesized audio signal 140, quality scores 150

(e.g., a first quality score associated with the filtered audio signal 130 and a second quality score associated with the synthesized audio signal 140), or a combination thereof, as further described with reference to FIG. 2. In a particular implementation, the output selection circuitry 114 is configured to initiate output of the enhanced speech signal at a speaker (e.g., an audio output device), as further described with reference to FIGS. 4A and 4B.

During operation, the audio sensor 102 may receive the audio input 120 and generate the input audio signal 122 based on the audio input 120. For example, the audio input 120 may include or correspond to speech of a person (e.g., a user). The speech may be noisy or otherwise degraded due to conditions of the environment. For example, the person may be far away from the audio sensor 102, there may be significant background noise or echo, or some other situation may cause the audio input 120 to be noisy or degraded. The audio sensor 102 may provide the input audio signal 122 to the speech state estimation circuitry 106. In some implementations, the audio sensor 102 may perform one or more pre-processing operations on the input audio signal 122.

The speech state estimation circuitry 106 may estimate one or more speech states of one or more portions of the input audio signal 122. For example, the speech state estimation circuitry 106 may perform model based, non-linear analysis on the input audio signal 122 to estimate the speech states. The speech state estimation circuitry 106 may generate the one or more parameters 132 based on the estimated speech states (e.g., speech state information). For example, the one or more parameters 132 may include speech state parameters, temporal parameters, emotion parameters, or a combination thereof. The speech state estimation circuitry 106 may provide the one or more parameters 132 to the speech generative circuitry 112, and the speech state estimation circuitry 106 may provide the input audio signal 122 to the filtering circuitry 108.

The filtering circuitry 108 may receive the input audio signal 122 and may generate the filtered audio signal 130 based on the input audio signal 122. For example, the filtering circuitry 108 may perform model based, non-linear filtering on the input audio signal 122 (e.g., using neural network(s), convolutional network(s), or other components) to generate the filtered audio signal 130. The filtering circuitry 108 may provide the filtered audio signal 130 to the speech recognition circuitry 110 and to the output selection circuitry 114.

The speech recognition circuitry 110 may generate the ASR data 134 based on the filtered audio signal 130. For example, the speech recognition circuitry 110 may perform one or more ASR operations on the filtered audio signal 130 to generate a transcript (e.g., the ASR data 134) of speech represented by the filtered audio signal 130. Additionally, the speech recognition circuitry 110 may generate the confidence score 136 associated with the ASR data 134. For example, the speech recognition circuitry 110 may compare the filtered audio signal 130 (or portions thereof) to previously processed speech (or portions thereof), and the speech recognition circuitry 110 may generate the confidence score 136 based on similarity between the filtered audio signal 130 and the previously processed speech.

The speech generative circuitry 112 may receive the ASR data 134 and the one or more parameters 132, and the speech generative circuitry 112 may generate the synthesized audio signal 140 based on the one or more parameters 132 and the ASR data 134. For example, the speech generative circuitry 112 include one or more neural networks that generate synthesized speech samples based on the ASR data 134 using the one or more parameters 132 to match (or reduce a difference between) characteristics of the synthesized audio signal 140 and the input audio signal 122. In a particular implementation, the speech generative circuitry 112 may generate the synthesized audio signal 140 based further on the training data parameters 138, which may enable a more synthesized speech generation than just using the one or more parameters 132. The speech generative circuitry 112 may provide the synthesized audio signal 140 to the output selection circuitry 114.

The output selection circuitry 114 may receive the synthesized audio signal 140, the filtered audio signal 130, and the confidence score 136, and the output selection circuitry 114 may generate the enhanced speech signal 124 based on a selected audio signal. To illustrate, the output selection circuitry 114 may select the filtered audio signal 130 or the synthesized audio signal 140, and the output selection circuitry may generate the enhanced speech signal 124 based on the selected audio signal. In some implementations, generating the enhanced speech signal 124 may include performing one or more post-processing operations on the selected audio signal. The selection may be made based on the confidence score 136, the similarity score 152, the quality scores 150, or a combination thereof, as described with reference to FIG. 2. In this manner, the output selection circuitry 114 may select the audio signal that is more likely to improve user experience. After generation of the enhanced speech signal 124, the output selection circuitry 114 may initiate output of the enhanced speech signal 124 at a speaker or another audio output device, or the output selection circuitry 114 may initiate transmission of the enhanced speech signal 124 to another device.

In a particular implementation, the speech processing circuitry 104 does not include the filtering circuitry 108. In such an implementation, the operations described above with respect to the filtered audio signal 130 are instead performed based on the input audio signal 122. For example, the ASR data 134 and the confidence score 136 may be based on the input audio signal 122, and the output selection circuitry 114 may select between the synthesized audio signal 140 and the input audio signal 122.

In a particular implementation, the system 100 may enable a smart speaker or device to provide enhanced speech to a far field listener. To illustrate, a user may speak a request to the system 100, such as "Please call Pizza Paradise. I would like to order a large pepperoni pizza." However, the user may be in a noisy environment, and playback of the input audio signal 122 may not be understandable to a listener. Instead, the system 100 may perform ASR operations in order to generate a transcript of the speech (e.g., the ASR data 134). Based on the transcript, the system 100 may identify the speech as an instruction to order pizza from Pizza Paradise. The system 100 may initiate a telephone call to Pizza Paradise, and the device may output the enhanced speech signal 124 (or the portion corresponding to "I would like to order a pepperoni pizza"). Because the enhanced speech signal 124 may be based on the synthesized audio signal 140, the enhanced speech signal 124 may sound like speech from a person, instead of sounding unnatural or having characteristics that do not match the context of the speech. Because the enhanced speech signal 124 has characteristics that match the context of the speech, intelligibility of the enhanced speech signal may be improved.

In another particular implementation, the system 100 may be included in a vehicle. To illustrate, a first person sitting in the front seat of a noisy vehicle may wish to communicate with a second person sitting in the back of the vehicle.

Speech that is uttered by the first person may be captured and filtered by the audio sensor 102 and the filtering circuitry 108, respectively. The synthesized audio signal 140 may be generated by the speech generative circuitry 112 (based on the ASR data 134 from the speech recognition circuitry 110). Based on various metrics (e.g., the confidence score 136, the quality scores 150, and the similarity score 152), either the filtered audio signal 130 or the synthesized audio signal 140 may be selected as the audio signal that the enhanced speech signal 124 corresponds to. In a particularly noisy environment, the synthesized audio signal 140 may more understandable to the second person than the filtered audio signal 130. Thus, the system 100 may generate the enhanced speech signal 124 based on the synthesized audio signal 140. The enhanced speech signal 124 may be output by a speaker in the back of the vehicle, or may be wirelessly transmitted to a headset or other audio listening device of the second person, to enable improved communication between the first person and the second person.

Thus, the system 100 enables generation of enhanced speech (e.g., enhanced audio signals) that are based on characteristics of particular speech in context and at a particular time. Because the synthesized audio signal 140 is based on the one or more parameters 132 (that are generated based on input speech at a particular time), the synthesized audio signal represents speech that may sound like input speech at the particular time. For example, the synthesized speech may have characteristics (e.g., pitch, modulation, energy level, envelope, emotional cues, etc.) that more closely match characteristics the input speech at the particular time than synthesized speech that is generated using other methods. Improving the similarity between the synthesized speech and the input speech may improve user experience associated with the system 100 and improve intelligibility of the synthesized speech.

Figure 2:
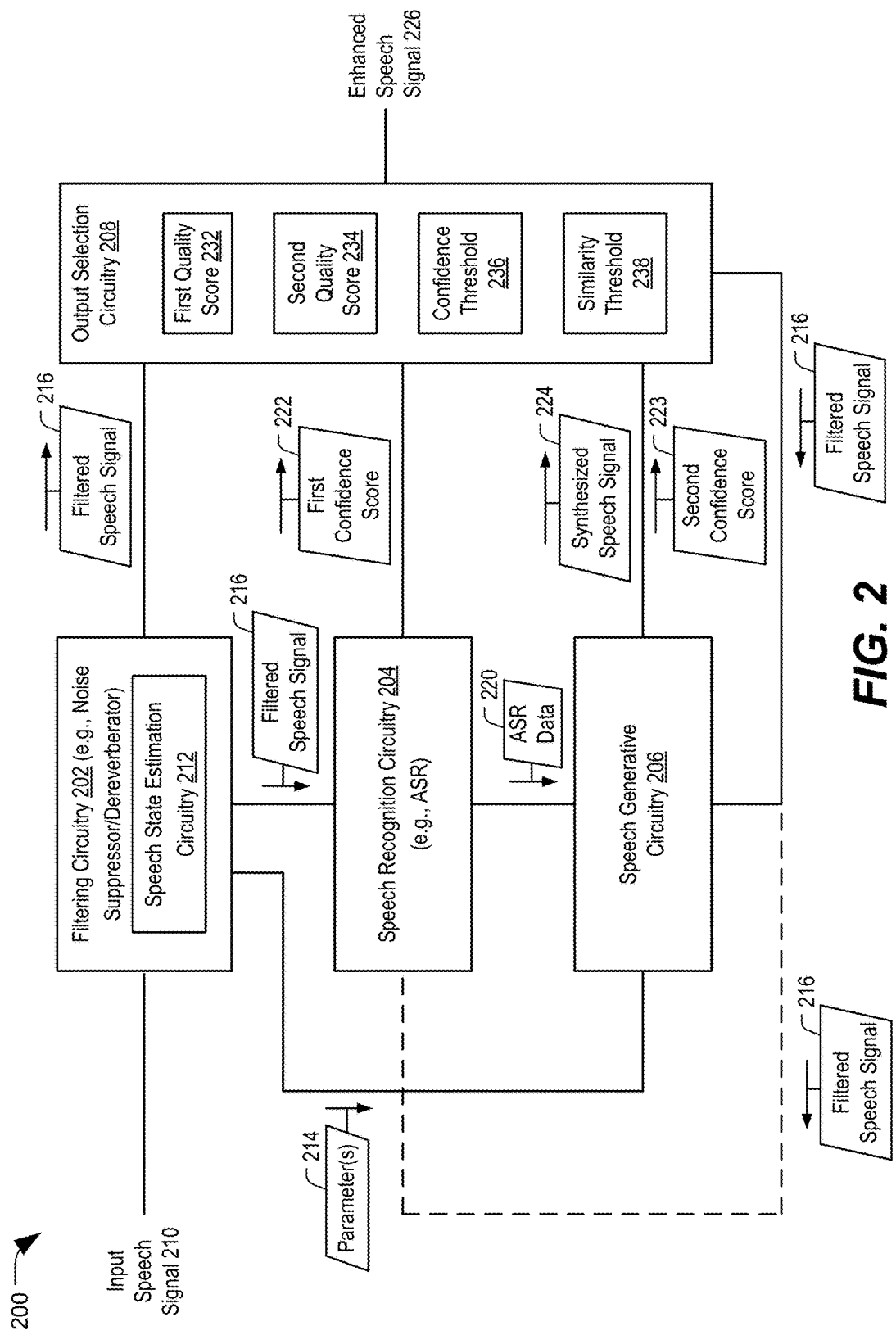
FIG. 2 is a block diagram of a particular illustrative aspect of an output speech selector system.

Referring to FIG. 2, a particular illustrative aspect of an output speech selector system is shown and generally designated 200. In a particular implementation, the output speech selector system 200 (or components thereof) may include or correspond to the system 100 (or components thereof) of FIG. 1.

The output speech selector system 200 includes filtering circuitry 202, speech recognition circuitry 204 coupled to the filtering circuitry 202, speech generative circuitry 206 coupled to the speech recognition circuitry 204 and the filtering circuitry 202, and output selection circuitry coupled to the filtering circuitry 202, the speech recognition circuitry 204, and the speech generative circuitry 206. In a particular implementation, the filtering circuitry 202, the speech recognition circuitry 204, the speech generative circuitry 206, and the output selection circuitry 208 may include or correspond to the filtering circuitry 108 (including the speech state estimation circuitry 106), the speech recognition circuitry 110, the speech generative circuitry 112, and the output selection circuitry 114, respectively. Additionally or alternatively, the output speech selector system 200 may include an audio sensor (not shown) configured to receive an audio input and an audio output device (not shown) configured to generate an audio output.

The filtering circuitry 202 may be configured to receive an input speech signal 210 and to generate a filtered speech signal 216 based on the input speech signal 210. For example, the filtering circuitry 202 may be configured to perform one or more noise suppression operations, one or more dereverberation operations, other filtering operations, or a combination thereof, on the input speech signal 210 to generate the filtered speech signal 216. In a particular implementation, the filtering circuitry 202 includes a LSTM-RNN, a DNN, a convolutional network, or a combination thereof, configured to filter the input speech signal 210.

The filtering circuitry 202 includes speech state estimation circuitry 212 that is configured to estimate one or more speech states (e.g., estimate speech information), and the speech state estimation circuitry 212 may be configured to generate one or more parameters 214 based on the estimated speech states. In a particular implementation, the speech state estimation circuitry 212 and the one or more parameters 214 include or correspond to the speech state estimation circuitry 106 and the one or more parameters 132. The estimated speech states correspond to SNR, isolated noise peaks, pitch, formant, prosody, envelope information (e.g., time, frequency, etc.), other state information, or a combination thereof.

In a particular implementation, the one or more parameters 214 indicate a regular state or an emotional state, a low pitch or a high pitch, speech content, non-speech content (e.g., noise), silence, speech pauses, transient states (e.g., down-transient or up-transient), other states, or a combination thereof. In a particular implementation, the one or more parameters 214 are estimated based on LSTM-RNN based speech state tracking using an enhanced variable rate codec (EVRC) speech codec. The one or more parameters 214 may differ for different portions of the input speech signal 210. As a particular example, a first portion of the input speech signal 210 may include 5 seconds of emotional speech having a high pitch, a second portion may include a 1 second speech pause, a third portion may include 5 seconds of emotional speech having a low pitch, a fourth portion may include a 1 second speech pause, a fifth section may include 2 seconds of regular speech, a sixth portion may include a 2 second speech pause, and a seventh portion may include 3 seconds of regular speech having a low pitch. In a particular implementation, at least some of the estimated speech states are estimated based on energy contours (in time and frequency sub-bands) associated with the speech. The one or more parameters 214 may include parameters for each portion that represent the above-described estimated speech states.

As a particular example, the speech state estimation circuitry 212 may include a 4-layer neural network with residual link. The total number of coefficients associated with the neural network may be approximately 400,000, as a non-limiting example. The neural network may be trained using training data that represents different people speaking, stationary noises, and non-stationary noises. Based on the training data, the neural network may be configured to estimate pitch states. As a particular non-limiting example, given input audio sampled in 20 milliseconds (ms) frames using 81 fast Fourier transform (FFT) bins (e.g., magnitude) without context frame stacking, the neural network may generate estimated state labels (e.g., 0-49, with 0 representing a dummy state and 1-49 representing a pitch log linear quantization index) with a frequency of 60 Hertz (Hz)-400 Hz and an estimated confidence level. The neural network may also be used to estimate other speech states, or the speech state estimation circuitry 212 may include additional circuitry that is configured to estimate the other speech states.

The speech recognition circuitry 204 is configured to receive the filtered speech signal 216 and to generate ASR data 220. For example, the speech recognition circuitry 204 may perform one or more ASR operations based on the filtered speech signal 216 to generate the ASR data 220. The ASR data 220 may represent a text transcript associated with the filtered speech signal 216. Additionally, the speech recognition circuitry 204 may be configured to generate (or estimate) a first confidence score 222 associated with the ASR data 220. The first confidence score 222 may indicate a confidence that the ASR data 220 represents a correct translation of the filtered speech signal 216 (or a portion thereof). For example, the speech recognition circuitry 204 may perform one or more calculations during the generation of the ASR data 220 to determine the first confidence score 222. Additionally or alternatively, the speech recognition circuitry 204 may compare the filtered speech signal 216 (or a portion thereof) to one or more training speech signals (or a portion thereof) to determine the first confidence score 222.

The speech generative circuitry 206 may be configured to receive the ASR data 220 and the one or more parameters 214, and the speech generative circuitry 206 may be configured to generate a synthesized speech signal 224 based on the ASR data 220 and the one or more parameters 214. For example, the speech generative circuitry 206 may include one or more speech generative networks configured to generate synthesized speech based on the ASR data 220 and the one or more parameters 214, as further described with reference to FIGS. 5 and 6. In a particular implementation, the speech generative circuitry 206 may include text conversion circuitry configured to perform one or more TTS operations. The speech generative circuitry 206 may also be configured to generate a second confidence score 223 (e.g., a similarity score). The second confidence score 223 may indicate a similarity between the synthesized speech signal 224 and a clean speech input, which may be generated by the trained neural network, as described with reference to FIG. 6.

In a particular implementation, the speech generative circuitry 206 and the speech recognition circuitry 204 may be configured to receive the filtered speech signal 216 (and one or more associated metrics or scores) from the output selection circuitry 208. The speech generative circuitry 206 and the speech recognition circuitry 204 may be configured to perform on-line model updating operations to update one or more models, training data, other information, or a combination thereof, that are used to generate the ASR data 220 and the synthesized speech signal 224.

The output selection circuitry 208 may be configured to receive the filtered speech signal 216, the first confidence score 222, the second confidence score 223, and the synthesized speech signal 224, and the output selection circuitry 208 may be configured to select a speech signal from the filtered speech signal 216 and the synthesized speech signal 224 based on the first confidence score 222, one or more other metrics, or a combination thereof, as further described herein. The output selection circuitry 208 may be configured to generate an enhanced speech signal 226 based on the selected speech signal. For example, the output selection circuitry 208 may select the filtered speech signal 216 or the synthesized speech signal 224 as the enhanced speech signal 226. Alternatively, the output selection circuitry 208 may be configured to perform one or more post-processing operations on the selected speech signal to generate the enhanced speech signal 226.

During operation, the output selection circuitry 208 may receive the filtered speech signal 216, the first confidence score 222, the second confidence score 223, and the synthesized speech signal 224. The output selection circuitry 208 may select either the filtered speech signal 216 or the synthesized speech signal 224 based on one or more metrics. For example, the output selection circuitry 208 may select the filtered speech signal 216 or the synthesized speech signal 224 based on the first confidence score 222, a second confidence score 223, a first quality score 232 associated with the filtered speech signal 216, a second quality score 234 associated with the synthesized speech signal 224, or a combination thereof.

To illustrate, the output selection circuitry 208 may select the filtered speech signal 216 in response to a determination that the first confidence score 222 fails to exceed a confidence threshold 236. For example, if the speech recognition results are associated with a low confidence, the synthesized speech signal 224 like represents incorrect speech (although the incorrect speech may be clear and may sound like the user). Therefore, when the first confidence score 222 fails to exceed (e.g., is less than or equal to) the confidence threshold 236, the filtered speech signal 216 is selected. As an example, a user may utter "What time is it in Seoul?", and the speech recognition circuitry 204 may generate a transcript of text that includes "What time is it in Seattle?" Even if a synthesized speech signal based on the transcript is very clear (e.g., has a high "objective quality"), the synthesized speech signal may not properly convey the user's words or meaning. Accordingly, even though the synthesized speech signal 224 may be associated with a high quality value, the filtered speech signal 216 may be selected.

In response to a determination that the first confidence score 222 exceeds the confidence threshold 236, the selection may be based on additional metrics. To illustrate, after a determination that the first confidence score 222 fails to exceed the confidence threshold 236, the output selection circuitry 208 may select the speech signal based on the second confidence score 223. For example, in response to a determination that the second confidence score 223 fails to exceed a similarity threshold 238 (e.g., a second confidence threshold), the output selection circuitry 208 may select the filtered speech signal 216. If the second confidence score 223 fails to exceed the similarity threshold 238, the synthesized speech signal 224 may be sufficiently different than clean input speech that a listener experience may be disrupted. To avoid disrupting the listener experience, the output selection circuitry 208 may select the filtered speech signal 216.

In response to a determination that the second confidence score 223 exceeds the similarity threshold 238, the output selection circuitry 208 may select the audio signal that is associated with a higher quality value. To illustrate, the output selection circuitry 208 may determine the first quality score 232 associated with the filtered speech signal 216 and the second quality score 234 associated with the synthesized speech signal 224. For example, the output selection circuitry 208 may determine a first speech mean opinion score (SMOS) associated with the filtered speech signal 216 and a second SMOS associated with the synthesized speech signal 224. Alternatively, the output selection circuitry 208 may receive the SMOS values from another component of the output speech selector system 200 that determines the SMOS values. The first quality score 232 and the second quality score 234 (e.g., the SMOS values) may represent an "objective quality" of the speech signals. Based on a comparison of the first quality score 232 to the second quality score 234, the output selection circuitry 208 may select a speech signal. For example, in response to a determination that the first quality score 232 exceeds the second quality score 234, the output selection circuitry 208 may select the filtered speech signal 216. Alternatively, if the first quality score 232 fails to exceed the second quality score 234, the output selection circuitry 208 may select the synthesized speech signal 224. Thus, the enhanced speech signal 226 may be generated based on a speech signal that is selected based on the first confidence score 222, the second confidence score 223, the first quality score 232, the second quality score 234, or a combination thereof.

In a particular implementation, different portions of the enhanced speech signal 226 may be based on different selected speech signals. For example, in response to a determination that the first confidence score 222 fails to exceed the confidence threshold 236 for a first portion of the synthesized speech signal 224, the first portion of the enhanced speech signal 226 may be generated based on a first portion of the filtered speech signal 216. Further, in response to a determination that the first confidence score 222 exceeds the confidence threshold 236, that the second confidence score 223 exceeds the similarity threshold 238, and that the second quality score 234 exceeds the first quality score 232 for a second portion of the synthesized signal, a second portion of the enhanced speech signal 226 may be generated based on the second portion of the synthesized speech signal 224. In this manner, the output selection circuitry 208 may be configured to combine portions of the filtered speech signal 216 and the synthesized speech signal 224 in order to generate the enhanced speech signal 226.

Thus, the output speech selector system 200 enables selection of a speech signal (e.g., the filtered speech signal 216 or the synthesized speech signal 224) based on more than quality metrics. For example, the speech signal may be selected based on a confidence score associated with a speech transcript (e.g., the first confidence score 222 associated with the ASR data 220), a similarity score that represents a similarity between a synthesized speech signal and a clean input speech signal (e.g., the second confidence score 223 associated with the synthesized speech signal 224), or both. Generating the enhanced speech signal 226 based on a speech signal that is selected in this manner may improve listener experience. For example, selecting the audio signal based on the first confidence score 222 may reduce (or prevent) incorrect words or sounds from being represented by the enhanced speech signal 226. Additionally, selecting the audio signal based on the second confidence score 223 may reduce the likelihood that the enhanced speech signal 226 is significantly different from clean speech. In this manner, the enhanced speech signal 226 is based on a speech signal that is selected to balance the potentially competing interests of providing a clear speech signal and providing a correct speech signal, as compared to systems that select output speech solely based on quality measurements. Balancing clarity of speech with correctness of speech when selecting a speech signal to be output may improve listener experience by generating output speech that is clear, correct, and sounds like a user.

Figure 3:
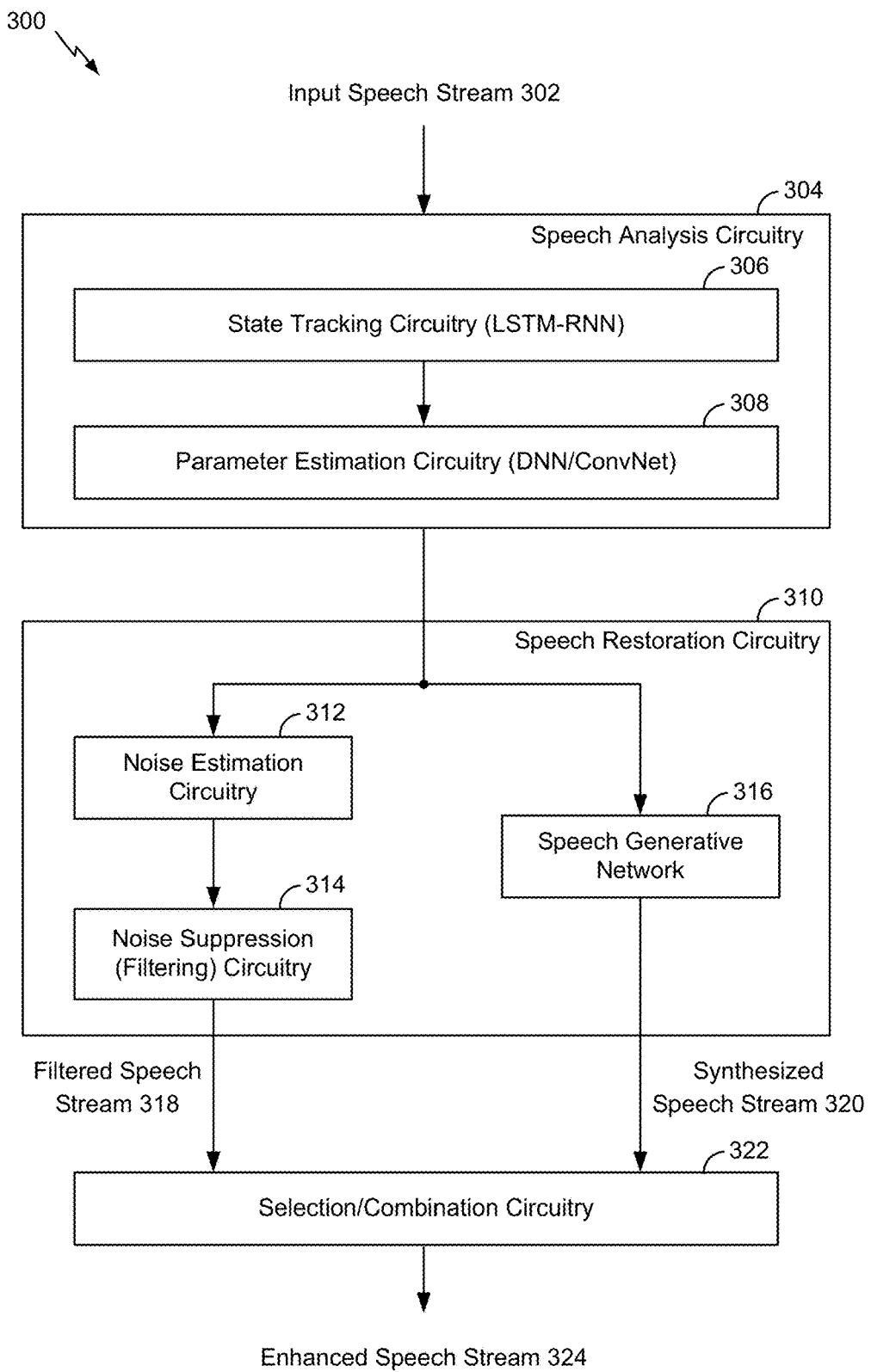
FIG. 3 is a block diagram of a particular illustrative aspect of a system that generates an enhanced speech stream.

Referring to FIG. 3, a particular illustrative aspect of a system that generates an enhanced speech stream is shown and generally designated 300. In a particular implementation, the system 300 (or components thereof) may include or correspond to the system 100 (or components thereof) of FIG. 1 or the output speech selector system 200 (or components thereof) of FIG. 2.

The system 300 includes speech analysis circuitry 304, speech restoration circuitry 310, and selection/combination circuitry 322. The system 300 may be configured to receive an input speech stream 302 and to generate an enhanced speech stream 324 based on the input speech stream 302.

The speech analysis circuitry 304 may include state tracking circuitry 306 and parameter estimation circuitry 308. The state tracking circuitry 306 may be configured to track speech states associated with the input speech stream 302 to generate speech state information. In a particular implementation, the state tracking circuitry 306 includes a LSTM-RNN configured to track the speech states. The parameter estimation circuitry 308 may be configured to generate one or more parameters indicative of the speech state information generated by the state tracking circuitry 306. The one or more parameters may include or correspond to the one or more parameters 132 of FIG. 1. In a particular implementation, the parameter estimation circuitry 308 includes a DNN, a convolution network, or both, that are configured to analyze the speech state information (and the input speech stream 302) to generate the one or more parameters.

The one or more parameters and the input speech stream 302 may be provided to the speech restoration circuitry 310. The speech restoration circuitry 310 may include noise estimation circuitry 312, noise suppression circuitry 314, and a speech generative network 316. The noise estimation circuitry 312 may be configured to estimate noise associated with the input speech stream 302. For example, the noise estimation circuitry 312 may determine a signal-to-noise ratio (SNR) associated with frames of the input speech stream 302. The noise suppression circuitry 314 may be configured to suppress the estimated noise from the input speech stream 302 to generate the filtered speech stream 318. For example, the noise suppression circuitry 314 may perform a model-based noise suppression (e.g., filtering) operation based on the input speech stream 302. The noise suppression circuitry 314 may also be referred to as noise filtering circuitry.

The speech generative network 316 may be configured to generate a synthesized speech stream 320 based on the input speech stream 302 and the one or more parameters. In a particular implementation, the speech generative network 316 includes circuitry configured to generate ASR data based on the input speech stream 302, and the synthesized speech stream 320 is generated based on the ASR data. Because the synthesized speech stream 320 is based on one or more parameters indicative of estimated speech states associated with the input speech stream 302, the synthesized speech stream 320 may sound more like natural speech of a person than synthesized speech streams generated by other speech synthesis systems. Additional details regarding the speech generative network 316 are described with respect to FIGS. 5 and 6. In a particular implementation, at least one operation performed by the speech generative network 316 is performed concurrently with at least one operation performed by the noise estimation circuitry 312, the noise suppression circuitry 314, or both.

The selection/combination circuitry 322 may be configured to receive the filtered speech stream 318 and the synthesized speech stream 320. The selection/combination circuitry 322 may be configured to generate the enhanced speech stream 324 based on either the filtered speech stream 318 or the synthesized speech stream 320. The selection may be based on a confidence metric associated with the synthesized speech stream 320, a difference metric that indicates a difference between the filtered speech stream 318 and the synthesized speech stream 320, and one or more quality metrics associated with the filtered speech stream 318 and the synthesized speech stream 320. For example, the selection/combination circuitry 322 may perform one or more of the comparisons described with reference to FIG. 2 to select either the filtered speech stream 318 or the synthesized speech stream 320. In a particular implementation, the selected speech stream (the filtered speech stream 318 or the synthesized speech stream 320) is provided as the enhanced speech stream 324. In an alternate implementation, the selection/combination circuitry 322 is configured to perform one or more post-processing operations on the selected speech stream to generate the enhanced speech stream 324.

Thus, the system 300 enables generation of an enhanced speech stream based on based on the filtered speech stream 318 or the synthesized speech stream 320. The selection may be based on a confidence metric associated with the synthesized speech stream 320, as well as other metrics. Selecting either filtered speech or synthesized speech based on the confidence metric and the other metrics may balance clarity of speech with correctness of speech. Balancing clarity of speech with correctness of speech when selecting a speech stream to be output may improve listener experience by generating an output speech stream that is clear, correct, and sounds like a person.

Figure 4A:
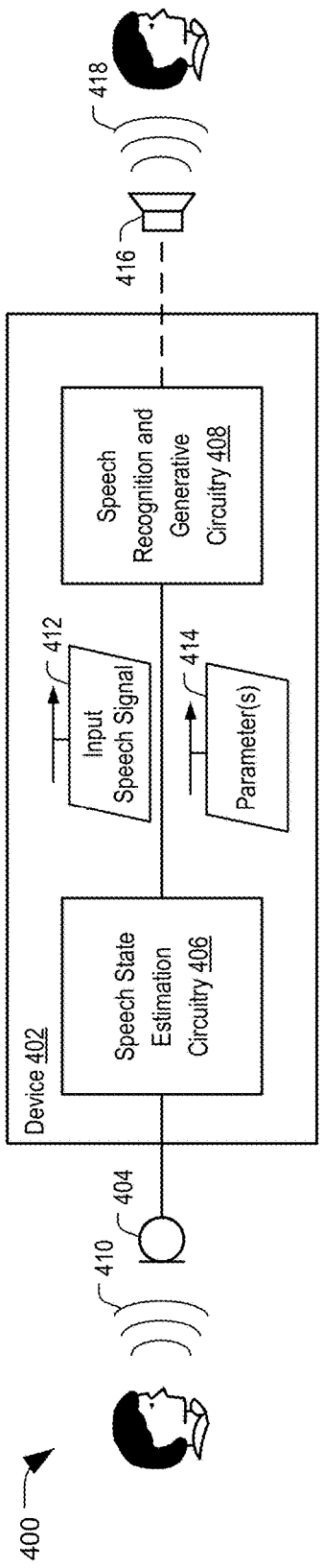
FIG. 4A is a block diagram of a first illustrative aspect of a system that generates enhanced speech to a listener.
Figure 4B:
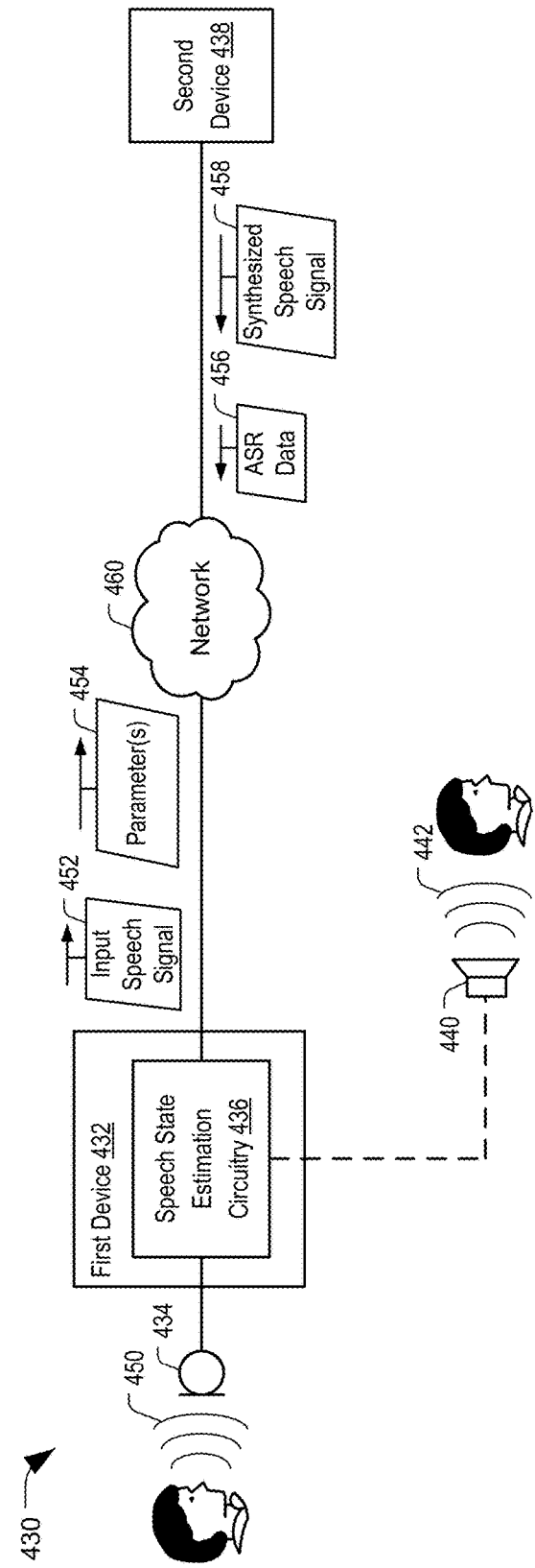
FIG. 4B is a block diagram of a second illustrative aspect of a system that generates enhanced speech to a listener.

FIGS. 4A and 4B illustrate two aspects of a system that generates enhanced speech to a far end user. In a particular implementation, the systems of FIGS. 4A and 4B may include or correspond to the system 100 of FIG. 1.

Referring to FIG. 4A, a first illustrative aspect of a system that generates enhanced speech to a listener is shown and generally designated 400. In a particular implementation, the system 400 (or components thereof) may include or correspond to the system 100 of FIG. 1 or the output speech selector system 200 of FIG. 2.

The system 400 includes a device 402 coupled to a microphone 404 (e.g., an audio sensor or audio capture device) and a speaker 416 (e.g., an audio output device). In a particular implementation, the device 402 includes a mobile device, such as a mobile phone, a laptop computer, a tablet computer, a media device, a smart appliance, a vehicle, another device, or a combination thereof. The device 402 includes speech state estimation circuitry 406 and speech recognition and generative circuitry 408. In a particular implementation, the microphone 404 and the speaker 416 are separate devices that are communicatively coupled to the device 402. Alternatively, one or both of the microphone 404 and the speaker 416 may be integrated within the device 402.

The microphone 404 may be configured to receive an audio input 410 (e.g., input speech) and to generate an input speech signal 412. The speech state estimation circuitry 406 may be configured to generate one or more parameters 414 based on the input speech signal 412. For example, the one or more parameters 414 may include or correspond to the one or more parameters 132 of FIG. 1 or the one or more parameters 214 of FIG. 2. In a particular implementation, the speech state estimation circuitry 406 is configured to filter the input speech signal 412 to generate a filtered speech signal.

The speech recognition and generative circuitry 408 may be configured to generate an enhanced speech signal based on the input speech signal 412 and the one or more parameters 414. In a particular implementation, the speech recognition and generative circuitry 408 is configured to select either the input speech signal 412 (or the filtered speech signal) or a synthesized speech signal generated based on the input speech signal 412 and the one or more parameters 414, and the enhanced speech signal is generated based on the selected speech signal. After generation of the enhanced speech signal, the device 402 is configured to initiate an enhanced speech output 418 (e.g., an audio output) at the speaker 416. The enhanced speech output 418 may be clear, substantially accurate, and may have characteristics in common with the audio input 410, which may improve listener experience. Although the enhanced speech output 418 is illustrated as being output at the speaker 416 that is part of the device 402, in other implementations, the enhanced speech output 418 may be output at a different device. For example, a user of the device 402 may initiate a telephone call to the listener, and the speaker 416 of the listener's phone may output the enhanced speech output 418.

Referring to FIG. 4B, a second illustrative aspect of a system that generates enhanced speech to a listener is shown and generally designated 430. In a particular implementation, the system 430 (or components thereof) may include or correspond to the system 100 of FIG. 1 or the output speech selector system 200 of FIG. 2.

The system 430 includes a first device 432 coupled to a microphone 434 (e.g., an audio sensor or audio capture device) and a speaker 440 (e.g., an audio output device). In a particular implementation, the first device 432 includes a mobile device, such as a mobile phone, a laptop computer, a tablet computer, a media device, a smart appliance, a vehicle, another device, or a combination thereof. The system 430 also includes a second device 438 that is communicatively coupled to the first device 432 via a network 460. In a particular implementation, the second device 438 represents one or more devices that are accessible to the first device 432 via the cloud.

The first device 432 includes speech state estimation circuitry 436. In a particular implementation, the microphone 434 and the speaker 440 are separate devices that are communicatively coupled to the first device 432. Alternatively, one or both of the microphone 434 and the speaker 440 may be integrated within the first device 432.

The microphone 434 may be configured to receive an audio input 450 (e.g., input speech) and to generate an input speech signal 452. The speech state estimation circuitry 436 may be configured to generate one or more parameters 454 based on the input speech signal 452. For example, the one or more parameters 454 may include or correspond to the one or more parameters 132 of FIG. 1 or the one or more parameters 214 of FIG. 2. In a particular implementation, the speech state estimation circuitry 436 is configured to filter the input speech signal 452 to generate a filtered speech signal.

The first device 432 may be further configured to transmit the input speech signal 452 (or the filtered speech signal) and the one or more parameters 454 via the network 460 to the second device 438. The second device 438 may be configured to perform one or more ASR operations and one or more speech generation operations based on the input speech signal 452 (or the filtered speech signal) and the one or more parameters 454. Performance of the one or more ASR operations and the one or more speech generation operations may cause the second device 438 to generate ASR data 456 and a synthesized speech signal 458. The second device 438 may be configured to transmit the ASR data 456 and the synthesized speech signal 458 to the first device 432.

The first device 432 may be configured to select between the input speech signal 452 (or the filtered speech signal) and the synthesized speech signal 458 as part of a process to generate an enhanced speech signal, and the first device 432 may initiate generation of an enhanced speech output 442 at the speaker 440. The enhanced speech output 442 may be clear, substantially accurate, and may have characteristics in common with the audio input 450, which may improve listener experience. Although the enhanced speech output 442 is illustrated as being output at the speaker 440 that is part of the first device 432, in other implementations, the enhanced speech output 442 may be output at a different device. For example, a user of the first device 432 may initiate a telephone call to the listener, and the speaker 440 of the listener's phone may output the enhanced speech output 442.

In an alternate implementation, filtering of the input speech signal 452 may be performed at the second device 438 (or one or more devices coupled to the second device 438). In another alternate implementation, the ASR data 456 may be generated at the first device 432 and transmitted via the network 460 to the second device 438 for generation of the synthesized speech signal 458. In another alternate implementation, the synthesized speech signal 458 may be generated at the first device 432 based on the ASR data 456 that is received from the second device 438. In another alternate implementation, the enhanced speech signal may be generated by the second device 438 and transmitted from the second device 438 via the network 460 to the speaker 440 to initiate output of the enhanced speech output 442. By offloading the ASR operations, the speech generation operations, the filtering operations, or a combination thereof, to devices in the cloud, the first device 432 may be provide the enhanced speech output 442 to the listener using fewer processing resources and reduced power consumption as compared to the device 402 of FIG. 4A.

Figure 5:
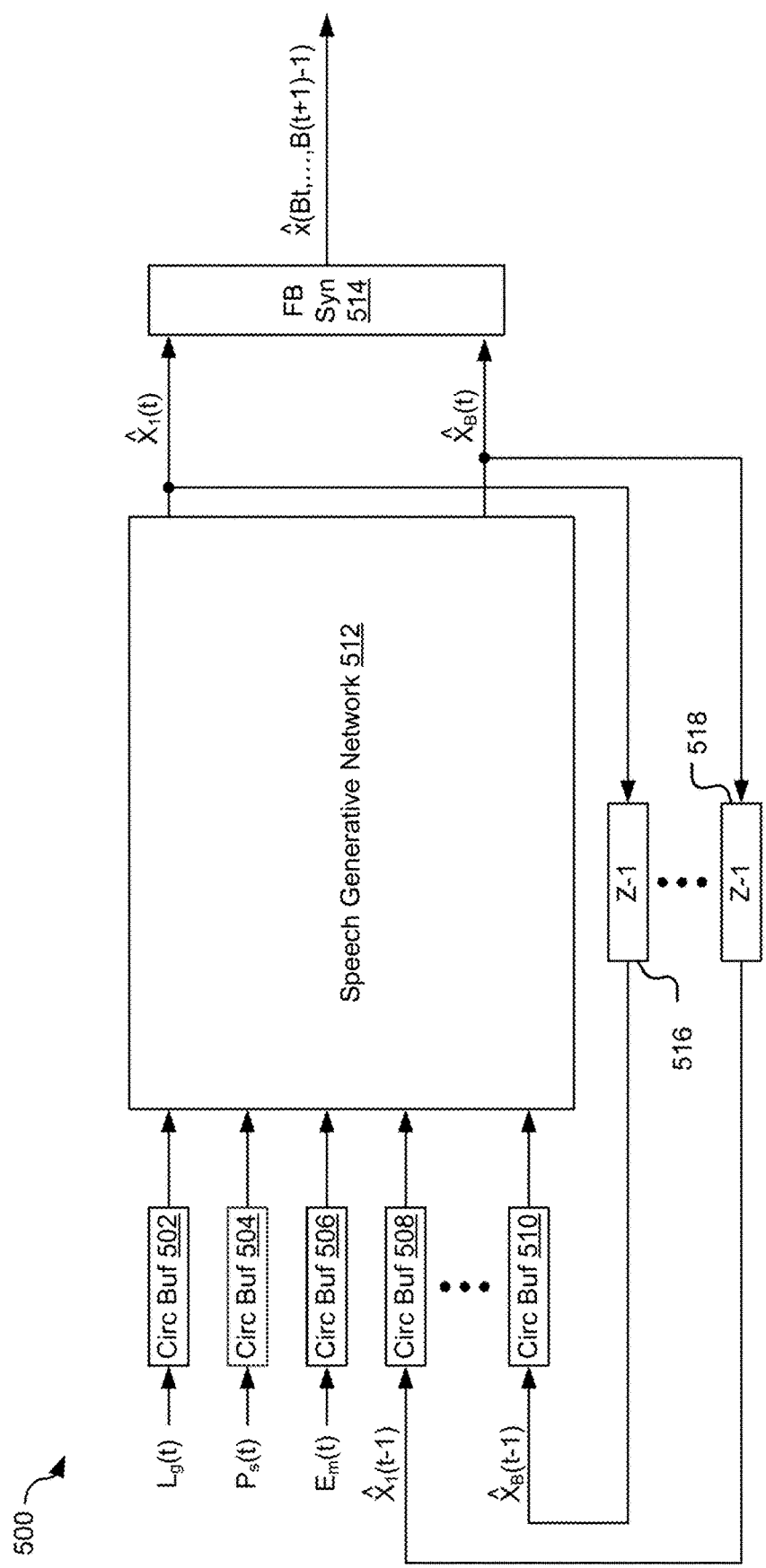
FIG. 5 is a block diagram of a first illustrative aspect of a speech generative system.

Referring to FIG. 5, a first illustrative aspect of a speech generative system is shown and generally designated 500. In a particular implementation, the speech generative system 500 may be integrated within the speech generative circuitry 112 of FIG. 1, the speech generative circuitry 206 of FIG. 2, the speech generative network 316 of FIG. 3, the speech recognition and generative circuitry 408 of FIG. 4A, or the second device 438 of FIG. 4B.

The speech generative system 500 includes a transcription circular buffer 502, a speech state circular buffer 504, an emotional cue circular buffer 506, a first circular buffer 508, a Bth circular buffer 510, a speech generative network 512 that is coupled to the circular buffers 502-510, a synthesis filter bank 514 ("FB Syn") coupled to the speech generative network 512, a first delay circuit 516 ("Z$^{-1}$") coupled to a first output of the speech generative network 512 and to the Bth circular buffer 510, and a Bth delay circuit 518 coupled to a Bth output of the speech generative network 512 and to the first circular buffer 508. Although two delay circuits and five circular buffers are illustrated, B may be any integer greater than one, and thus the speech generative system 500 may include more than five circular buffers and more than two delay circuits.

The transcription circular buffer 502 may be configured to receive transcription parameters Lg(t) (e.g., linguistics parameters) from speech recognition circuitry, such as the speech recognition circuitry 110 of FIG. 1 or the speech recognition circuitry 204 of FIG. 2. The speech state circular buffer 504 may be configured to receive estimated speech state parameters Ps(t) (e.g., prosody parameters) and energy contour parameters from speech state estimation circuitry, such as the speech state estimation circuitry 106 of FIG. 1 or the speech state estimation circuitry 212 of FIG. 2. The emotional cue circular buffer 506 may be configured to receive emotional cue parameters Em(t) (e.g., emotional conditioning parameters) from the speech state estimation circuitry, from another source (e.g., emotional cue parameters based on training data), or from both. The first circular buffer 508 may be configured to receive a first previous frequency domain sub-band component $\hat{x}_1(t-1)$ and the Bth circular buffer 510 may be configured to receive a Bth previous frequency domain sub-band component $\hat{x}_B(t-1)$. The circular buffers 502-510 may be configured to store corresponding inputs and to send the corresponding inputs to the speech generative network 512.

The speech generative network 512 may be configured to generate frequency domain sub-band components of a synthesized speech signal based on an input speech signal (not shown), one or more parameters, and previous frequency domain sub-band components (e.g., corresponding to previous speech frames). For example, the speech generative network 512 may generate a first frequency domain sub-band component $\hat{x}_1(t)$ and a Bth frequency domain sub-band component $\hat{x}_B(t)$ based on the linguistics parameters, the prosody parameters, the emotional cue parameters, a first previous frequency domain sub-band component $\hat{x}_1(t-1)$ (e.g., based on a first previous speech frame), and a Bth frequency domain sub-band component $\hat{x}_B(t-1)$ (e.g., based on a Bth previous speech frame). In a particular implementation, the speech generation network 512 includes one or more neural networks, such as a DNN, one or more convolutional networks, other circuitry, or a combination thereof. The speech generative network 512 may be configured to perform one or more functions, such as a rectified linear unit function (relu( )), a hyperbolic tangent function (tan h( )), a sigmoid function (sigmoid( )), or a combination thereof, as non-limiting examples. The first frequency domain sub-band component $\hat{x}_1(t-1)$ may be provided to the first delay circuit 516 and to the synthesis filter bank 514, and the Bth frequency domain sub-band component $\hat{x}_B(t-1)$ may be provided to the Bth delay circuit 518 and to the synthesis filter bank 514.

The first delay circuit 516 may be configured to provide the first frequency domain sub-band component $\hat{x}_1(t)$ to the Bth circular buffer 510 after a particular delay (e.g., a one frame delay, as a non-limiting example). The Bth delay circuit 518 may be configured to provide the Bth frequency domain sub-band component $\hat{x}_B(t)$ to the first circular buffer 508 after the particular delay.

The synthesis filter bank 514 may be configured to receive the first frequency domain sub-band component $\hat{x}_1(t)$ and the Bth frequency domain sub-band component $\hat{x}_B(t)$ and to convert the frequency domain sub-band components into time domain samples that are used generate estimated speech frames $\hat{x}(Bt, \ldots, B(t+1)-1)$. The synthesized speech frames correspond to a synthesized speech signal, such as the synthesized audio signal 140 of FIG. 1 or the synthesized speech signal 224 of FIG. 2.

In a particular implementation, the speech generative system 500 may be trained to cause the synthesized speech frames $\hat{x}(Bt, \ldots, B(t+1)-1)$ to more closely match input speech samples for particular sets of the parameters Lg(t), Ps(t), and Em(t). For example, the speech generative system 500 may be trained using various values of the parameters Lg(t), Ps(t), and Em(t) to reduce a distance (e.g., increase the similarity) between clean speech ground truth samples x (Bt, . . . , B(t+1)−1) (e.g., input speech samples) and the synthesized speech frames $\hat{x}(Bt, \ldots, B(t+1)-1)$. The distance may be a Euclidean distance, an Itakura Saito distance, a minimum mean square error (MMSE), or another measurement, as non-limiting examples. By minimizing the distance between training data (e.g., the clean speech ground truth samples) and output synthesized speech, the speech generative system 500 may be trained to generate synthesized speech that more closely resembles user speech in pitch, tempo, emotion, and other characteristics, which may improve user experience with the speech generative system 500.

Figure 6:
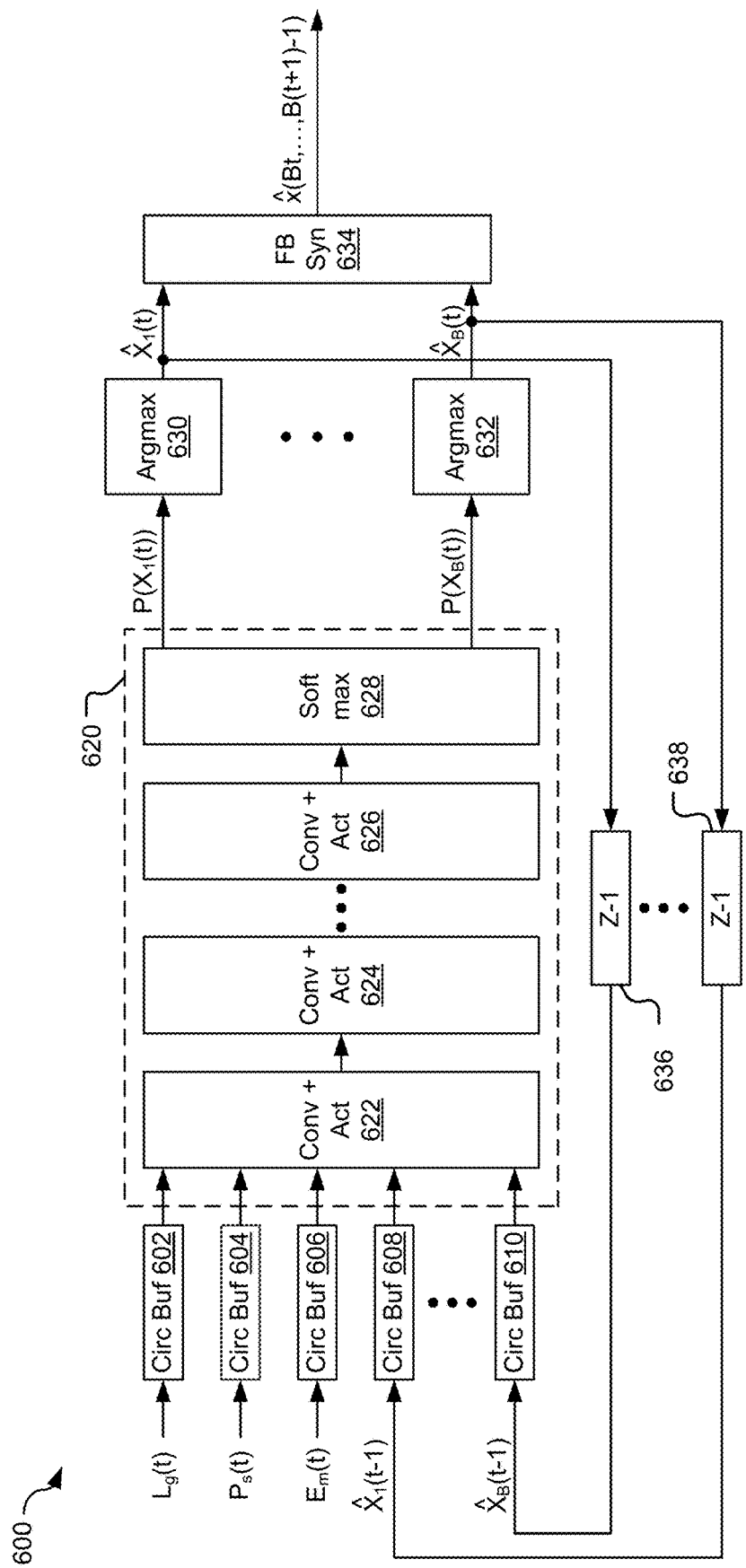
FIG. 6 is a block diagram of a second illustrative aspect of a speech generative network.

Referring to FIG. 6, a second illustrative aspect of a speech generative system is shown and generally designated 600. In a particular implementation, the speech generative system 600 may be integrated within the speech generative circuitry 112 of FIG. 1, the speech generative circuitry 206 of FIG. 2, the speech generative network 316 of FIG. 3, the speech recognition and generative circuitry 408 of FIG. 4A, or the second device 438 of FIG. 4B.

The speech generative system 600 includes a transcription circular buffer 602, a speech state circular buffer 604, an emotional cue circular buffer 606, a first circular buffer 608, a Bth circular buffer 610, a multilayer convolutional network 620 that is coupled to the circular buffers 602-610, a first arguments of the maxima ("argmax") circuit 630 coupled to the multilayer convolutional network 620, a Bth argmax circuit 632 coupled to the multilayer convolutional network 620, a synthesis filter bank 634 ("FB Syn") coupled to the argmax circuits 630, 632, a first delay circuit 636 ("$Z^{-1}$") coupled to the first argmax circuit 630 and to the Bth circular buffer 610, and a Bth delay circuit 638 coupled to the Bth argmax circuit 632 and to the first circular buffer 608. Although two argmax circuits, two delay circuits, and five circular buffers are illustrated, B may be any integer greater than one, and thus the speech generative system 600 may include more than five circular buffers, more than two delay circuits, and more than two argmax circuits.

The transcription circular buffer 602 may be configured to receive transcription parameters Lg(t) (e.g., linguistics parameters) from speech recognition circuitry, such as the speech recognition circuitry 110 of FIG. 1 or the speech recognition circuitry 204 of FIG. 2. The speech state circular buffer 604 may be configured to receive estimated speech state parameters Ps(t) (e.g., prosody parameters) and energy contour parameters from speech state estimation circuitry, such as the speech state estimation circuitry 106 of FIG. 1 or the speech state estimation circuitry 212 of FIG. 2. The emotional cue circular buffer 606 may be configured to receive emotional cue parameters Em(t) (e.g., emotional conditioning parameters) from the speech state estimation circuitry, from another source (e.g., emotional cue parameters based on training data), or from both. The first circular buffer 608 may be configured to receive a first previous frequency domain sub-band component $\hat{x}_1(t-1)$ and the Bth circular buffer 610 may be configured to receive a Bth previous frequency domain sub-band component $\hat{x}(t-1)$. The circular buffers 602-610 may be configured to store corresponding inputs and to send the corresponding inputs to the multilayer convolutional network 620.

The multilayer convolutional network 620 includes a first convolution and nonlinear activator 622 ("Conv+Act"), a second convolution and nonlinear activator 624, a Bth convolution and non-linear activator 626, and a discrete probability distribution circuit 628 ("Softmax"). The convolution and nonlinear activators 622-626 may be configured to perform convolution and nonlinear activation on corresponding inputs to generate corresponding outputs. For example, the convolution and nonlinear activators 622-626 may be configured to apply functions such as a rectified linear unit function (relu( )), a hyperbolic tangent function (tan h( )), a sigmoid function (sigmoid( )), or a combination thereof.

The discrete probability distribution circuit 628 may be configured to receive the outputs of the plurality of convolution and nonlinear activators 622-626 and to determine one or more discrete probability distributions based on the outputs. For example, the discrete probability distribution circuit 628 may generate a first discrete probability distribution (e.g., a condition distribution) $P(x_1(t))$ and a Bth discrete probability distribution $P(x_B(t))$. As used herein, $P(x_b(t))$ is a short hand of the following conditional distribution:

$$P(x_b(t)|x_1(t-1), \ldots, t-M_1), \ldots x_B(t-1, \ldots, t-M_B), \\ Lg(t-1, \ldots, t-M_{Lg}), Ps(t-1, \ldots, t-M_{Ps}), Em(t-1, \ldots, t-M_{Em}))$$

where $x_1(t)$, $x_B(t)$ are sub-band samples associated with frame t, $M_1, \ldots, M_B$ are the receptive field lengths (in frames) of the sub-band samples, and $M_{Lg}$, $M_{Ps}$, and $M_{Em}$ are the receptive field lengths of Lg, Ps, and Em, respectively.

The first argmax circuit 630 may be configured to apply an argmax function to the first discrete probability distribution $P(x_1(t))$. Application of the argmax function may generate a first frequency domain sub-band component $\hat{x}_1(t)$ that is associated with a maximum value of the first probability distribution $P(x_1(t))$. The Bth argmax circuit 632 may be configured to apply the argmax function to the Bth discrete probability distribution $P(x_B(t))$. Application of the argmax function may generate a Bth frequency domain sub-band component $\hat{x}_B(t)$ that is associated with a maximum value of the Bth probability distribution $P(x_B(t))$. The first frequency domain sub-band component $\hat{x}_1(t)$ may be sent to the first delay circuit 636 and to the synthesis filter bank 634, and the Bth frequency domain sub-band component $\hat{x}_B(t)$ may be sent to the Bth delay circuit 638 and to the synthesis filter bank 634.

The first delay circuit 636 may be configured to provide the first frequency domain sub-band component $\hat{x}_1(t)$ to the Bth circular buffer 610 after a particular delay (e.g., a one frame delay, as a non-limiting example). The Bth delay circuit 638 may be configured to provide the Bth frequency domain sub-band component $\hat{x}_B(t)$ to the first circular buffer 608 after the particular delay.

The synthesis filter bank 634 may be configured to receive the first frequency domain sub-band component $\hat{x}_B(t)$ and the Bth frequency domain sub-band component $\hat{x}_B(t)$ and to convert the frequency domain sub-band components into time domain samples that are used to generate synthesized speech frames $\hat{x}(Bt, \ldots, B(t+1)-1)$. The synthesized speech frames correspond to a synthesized speech signal, such as the synthesized audio signal 140 of FIG. 1 or the synthesized speech signal 224 of FIG. 2.

In a particular implementation, the speech generative system 600 may be trained to cause the synthesized speech frames $\hat{x}(Bt, \ldots, B(t+1)-1)$ to more closely match input speech frames for particular sets of the parameters Lg(t), Ps(t), and Em(t). For example, the speech generative system 600 may be trained using various values of the parameters Lg(t), Ps(t), and Em(t) to reduce a distance (e.g., increase the similarity) between clean speech ground truth samples x (Bt, ..., B(t+1)-1) (e.g., input speech samples) and the synthesized speech frames $\hat{x}(Bt, \ldots, B(t+1)-1)$.

Thus, the speech generative system 600 may generate a synthesized speech signal based on ASR data (e.g., the transcription parameters Lg(t)) and one or more other parameters (e.g., the estimated speech state parameters Ps(t) and the emotional cue parameters Em(t)) that are based on a current input speech signal. The synthesized speech signal may represent synthesized speech that sounds more like a person speaking at a particular time and in a particular context than synthesized speech generated using other systems.

Figure 7:
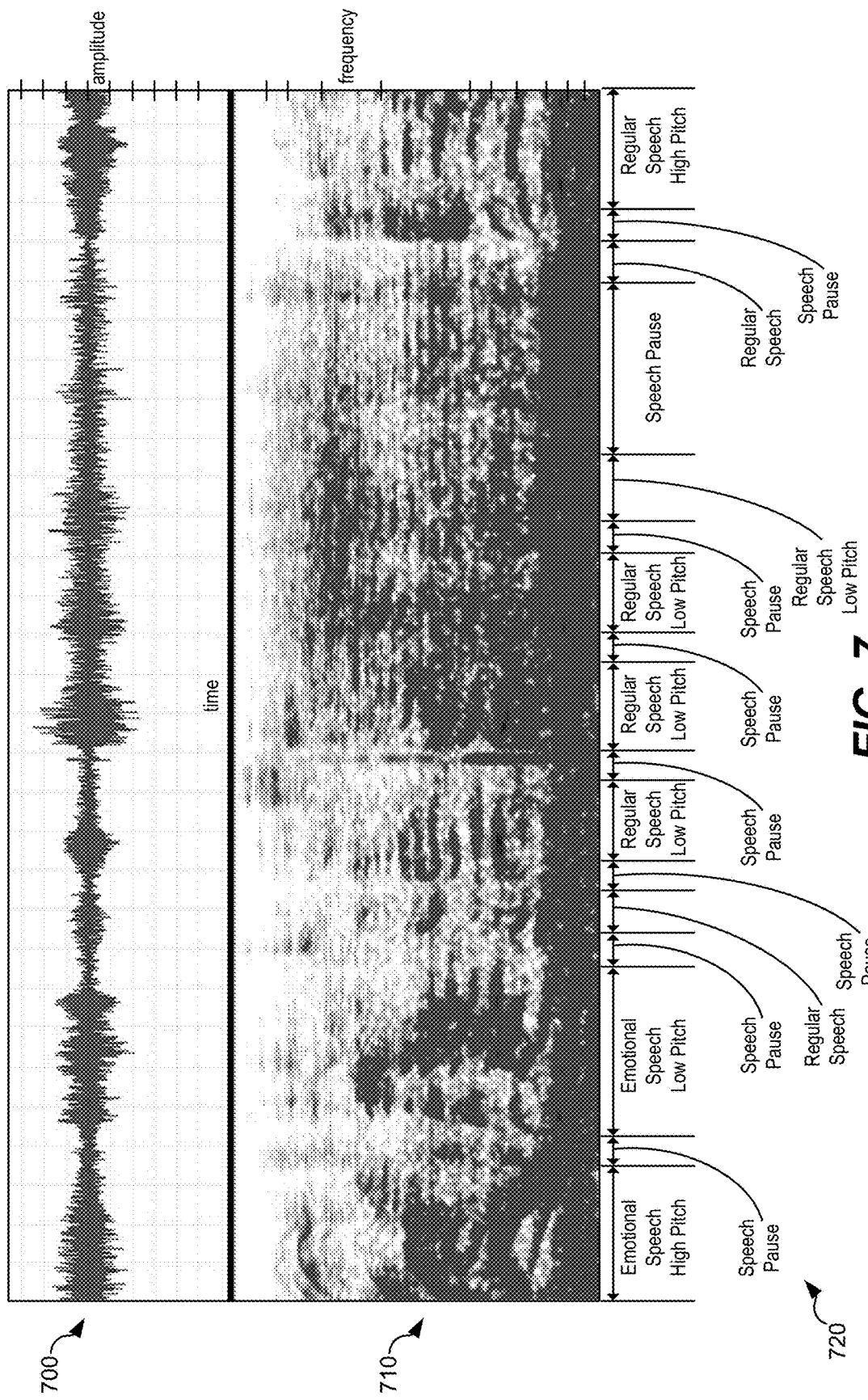
FIG. 7 illustrates examples of estimated speech states based on amplitude and frequency characteristics of an input audio signal.

FIG. 7 illustrates examples of estimated speech states based on amplitude and frequency characteristics of an input audio signal. A first graph 700 illustrates amplitude of an input audio signal and a second graph 710 illustrates frequency of the input audio signal. The horizontal axis of the first graph 700 represents time and the vertical axis of the first graph 700 represents amplitude. The horizontal axis of the second graph 710 represents time and the vertical axis of the second graph 710 represents frequency. The input audio signal may include or correspond to the input audio signal 122 of FIG. 1, the input speech signal 210 of FIG. 2, the input speech stream 302 of FIG. 3, the input speech signal 412 of FIG. 4A, or the input speech signal 452 of FIG. 4B. In a particular implementation, the input audio signal is a filtered audio signal (e.g., an audio signal that has undergone noise reduction). Alternatively, the input audio signal may be unfiltered.

Speech states 720 may be labeled based on the first graph 700 and the second graph 710 (e.g., based on amplitude and frequency of the input audio signal). In a particular implementation, the labels (e.g., the speech states) include emotional/regular, low pitch/high pitch, voiced/unvoiced, speech pause, other labels, or a combination thereof. As illustrated in FIG. 7, speech labels (e.g., speech states) based on the input audio signal associated with the graphs 700 and 710 include emotional speech+high pitch, speech pause, emotional speech+low pitch, speech pause, regular speech, speech pause, regular speech+low pitch, speech pause, regular speech+low pitch, speech pause, regular speech+low pitch, speech pause, regular speech+low pitch, speech pause, regular speech, speech pause, and regular speech+high pitch. The speech state labels may be used to generate one or more parameters for use in generating a synthesized speech signal that more closely resembles the input audio signal than synthesized speech signals generated using other methods.

Figure 8:
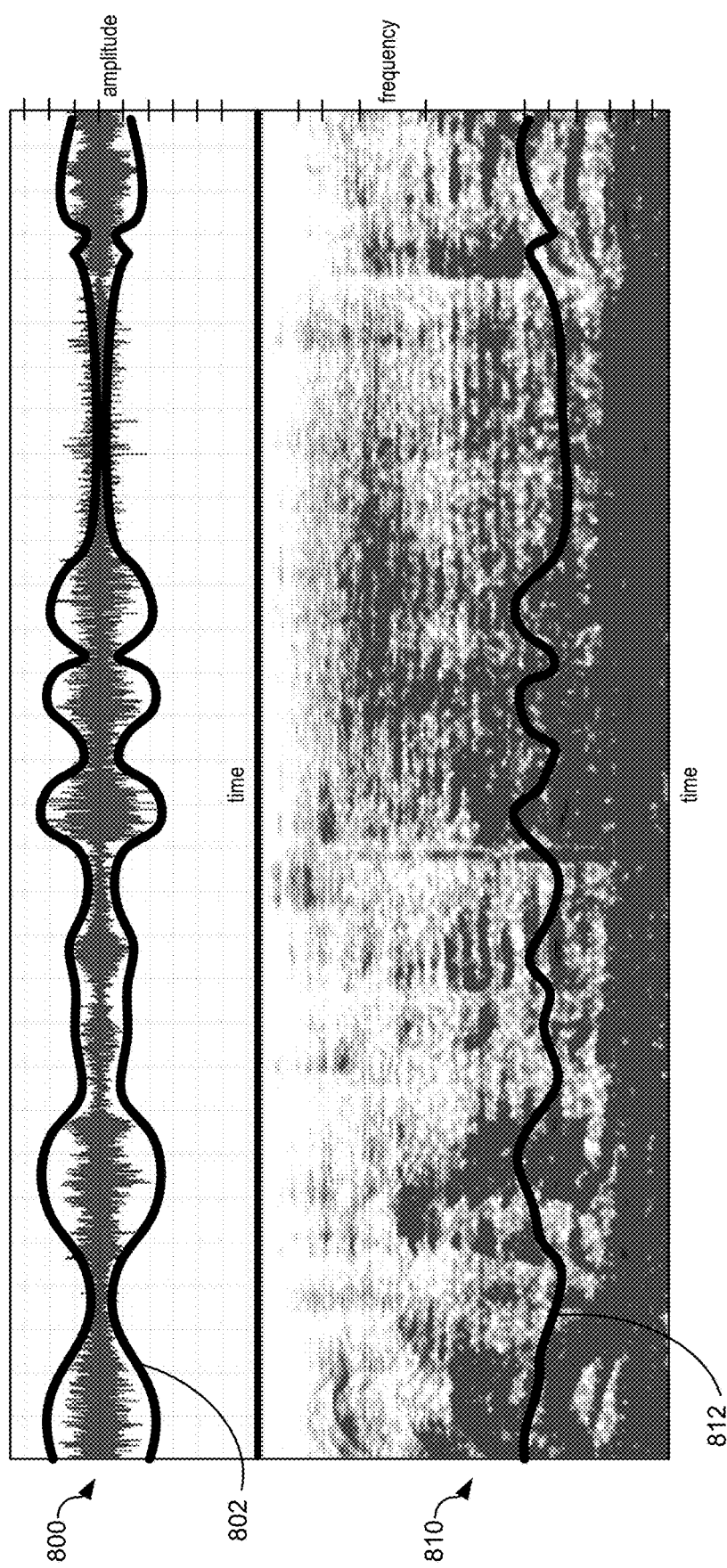
FIG. 8 illustrates examples of energy contours representative of estimated speech states.

FIG. 8 illustrates examples of energy contours representative of estimated speech states of input audio signals. A first graph 800 illustrates amplitude of an input audio signal and a second graph 810 illustrates frequency of the input audio signal. The horizontal axis of the first graph 800 represents time and the vertical axis of the first graph 800 represents amplitude. The horizontal axis of the second graph 810 represents time and the vertical axis of the second graph 810 represents frequency. The input audio signal may include or correspond to the input audio signal 122 of FIG. 1, the input speech signal 210 of FIG. 2, the input speech stream 302 of FIG. 3, the input speech signal 412 of FIG. 4A, or the input speech signal 452 of FIG. 4B. In a particular implementation, the input audio signal is a filtered audio signal (e.g., an audio signal that has undergone noise reduction). Alternatively, the input audio signal may be unfiltered.

Energy contours may be determined based on the amplitude or frequency of the input audio signal. For example, first energy contours 802 may be determined based on the amplitude of the input audio signal, and second energy contours 812 may be determined based on the frequency of the input audio signal. Speech states may be estimated based on the energy contours 802 and 812. For example, energy contours representing a high amplitude may correspond to emotional speech, and energy contours having a very low amplitude may correspond to speech pauses. The estimated speech states may be used to generate one or more parameters for use in generating a synthesized speech signal that more closely resembles the input audio signal than synthesized speech signals generated using other methods.

Figure 9:
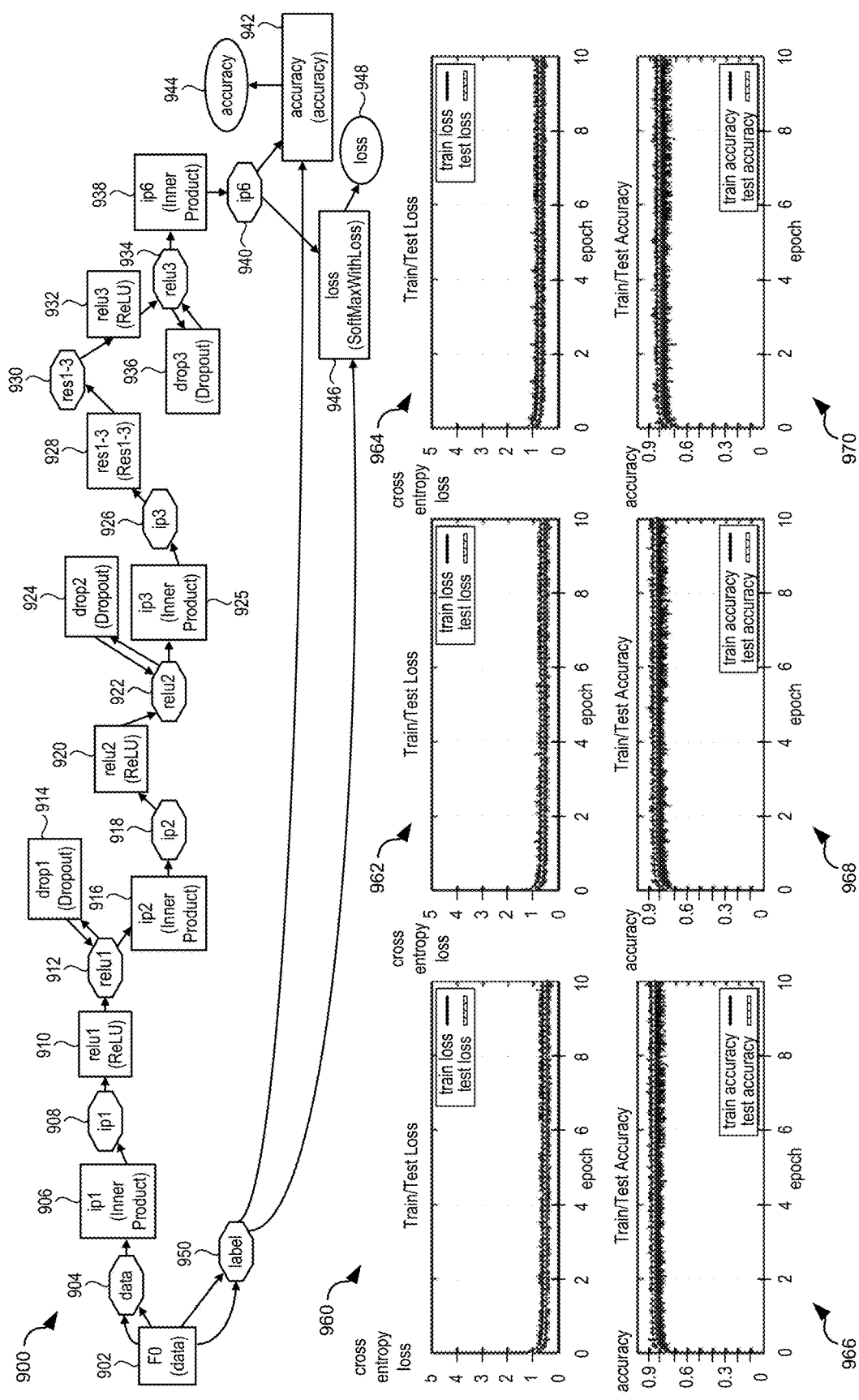
FIG. 9 is a block diagram of a particular illustrative aspect of a residual network configured to determine an estimated pitch of an audio signal.

Referring to FIG. 9, a particular illustrative aspect of a residual network configured to determine an estimated pitch of an audio signal is shown and generally designated 900. The residual network 900 may be integrated within the speech generative circuitry 112 of FIG. 1, the speech generative circuitry 206 of FIG. 2, the speech generative network 316 of FIG. 3, the speech recognition and generative circuitry 408 of FIG. 4A, or the second device 438 of FIG. 4B.

The residual network 900 includes a convolutional neural network (or other type of neural network) that is configured to determine a pitch of an input audio signal. The residual network 900 is configured to be trained using training data, such that the residual network 900 receives training data 902. The training data 902 includes data 904 (e.g., the training data) and labels 950 (which are used to determine the loss and the accuracy of the pitch detection process. A first inner product (IP) function 906 is applied to the data 904 to generate a first IP 908. A first rectified linear unit (relu) function 910 is applied to the first IP 908 to generate a first relu 912. A first dropout function 914 is applied to the first relu 912 to modify the first relu 912, and a second IP function 916 is applied to the modified first relu 912 to generate a second IP 918. A second relu function 920 is applied to the second IP 918 to generate a second relu 922. A second dropout function 924 is applied to the second relu 922 to modify the second relu 922, and a third IP function 925 is applied to the modified second relu 922 to generate a third IP 926. A first residual function 928 is applied to the third IP 926 to generate a first residual 930. A third relu function 932 is applied to the first residual 930 to generate a third relu 934. A third dropout function 936 is applied to the third relu 934 to modify the third relu 934, and a fourth IP 938 is applied to the modified third relu 934 to generate a fourth IP 940. An accuracy comparison 942 is applied to the fourth IP 940 and the label 950 to generate an accuracy score 944, and a loss function 946 (e.g., a SoftMaxWithLoss function) is applied to the fourth IP 940 and the label 950 to generate a loss score 948 (e.g., a cross entropy loss score).

FIG. 9 also illustrates graphs 960-970. The graphs illustrate test loss (e.g., cross entropy loss) and accuracy results using particular training data and three test signals. As a particular example, the training data may include speech from approximately 109 different people, approximately 27 types of stationary and non-stationary noises, approximately 110 hours of audio content, a signal to noise ratio of approximately −6.12 dB, and a sound pressure level of approximately −40.0 dB. In other implementations, other training data may be used. A first graph 960 and a second graph 966 correspond to a first test having a delay of 30 ms and using 1 look-back and 1 look-ahead. A third graph 962 and a fourth graph 968 correspond to a second test having a delay of 20 ms and using 1 look-back. A fifth graph 964 and a sixth graph 970 correspond to a third test having a delay of 20 ms and low complexity (e.g., no look-back or look-ahead).

Graphs 960-964 illustrate test loss (e.g., cross entropy loss) associated with the three test signals. In graphs 960-964, the solid line represents loss associated with the training data, and the dashed line represents loss associated with the corresponding test signal. A minimum test loss of (9.89, 0.4660) is associated with the first test signal, a minimum test loss of (9.76, 0.5280) is associated with the second test signal, and a minimum test loss of (9.75, 0.6724) is associated with the third test signal. Graphs 966-970 illustrate accuracy associated with the three test signals. In graphs 966-970, the solid line represents accuracy associated with the training data, and the dashed line represents accuracy associated with the corresponding test signal. A maximum test accuracy of (9.89, 0.8715) is associated with the first test signal, a maximum test accuracy of (9.92, 0.08543) is associated with the second test signal, and a maximum test accuracy of (9.91, 0.8276) is associated with the third test signal. Thus, the residual network 900 of FIG. 9 is trained to detect pitch of input audio signals with low loss and high accuracy.

Figure 10:
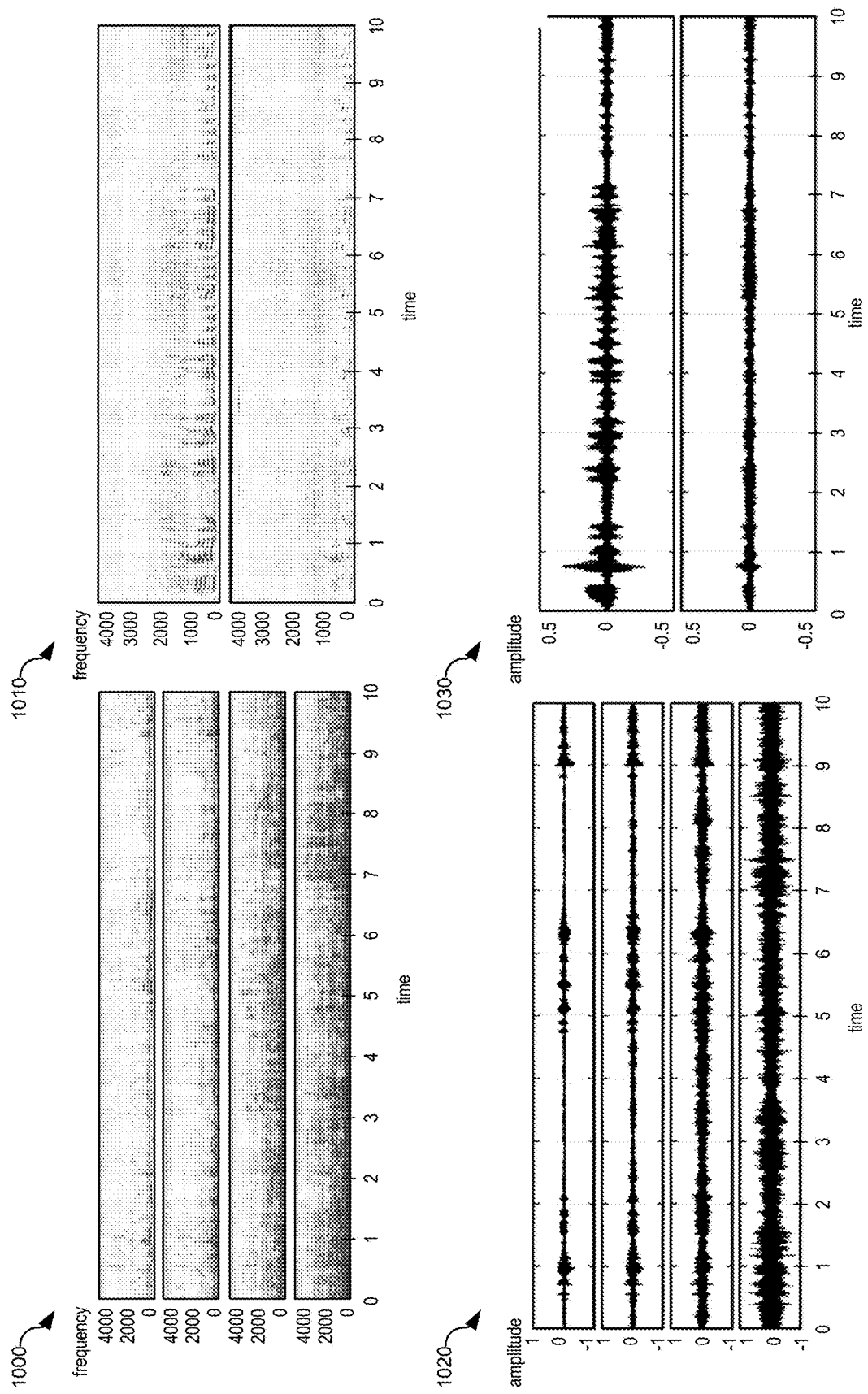
FIG. 10 illustrates examples of pitch detection results.

FIG. 10 illustrates examples of pitch detection results. A first set of graphs 1000 illustrates frequency of four input audio signals and a second set of graphs 1020 illustrates amplitude of the four input audio signals. The horizontal axes of the first set of graphs 1000 represent time and the vertical axes of the first set of graphs 1000 represent frequency. The horizontal axis of the second set of graphs 1020 represent time and the vertical axes of the second set of graphs 1020 represent amplitude. The four input audio signals may include or correspond to the input audio signal 122 of FIG. 1, the input speech signal 210 of FIG. 2, the input speech stream 302 of FIG. 3, the input speech signal 412 of FIG. 4A, or the input speech signal 452 of FIG. 4B. In a particular implementation, the four input audio signals are filtered audio signals (e.g., audio signals that have undergone noise reduction). Alternatively, the four input audio signals may be unfiltered.

To illustrate a particular example, the four input audio signals include synthesized Dutch speech and "babble" noise. The first input audio signal is associated with a SNR of 6.00 decibels (dB) and a sound pressure level of −24.66 dB, the second input audio signal is associated with a SNR of 0.00 dB and a sound pressure level of −22.60 dB, the third input audio signal is associated with a SNR of −6.00 dB and a sound pressure level of −18.64 dB, and the fourth input audio signal is associated with a SNR of −12.00 dB and a sound pressure level of −13.37 dB. Using the residual network 900, pitch detection performed on both input audio signals to determine pitch characteristics of the input audio signals. The pitch characteristics may be associated with one or more parameters that are used to generate synthesized speech, as described with reference to FIGS. 1-6.

FIG. 10 also includes a third set of graphs 1010 that illustrates frequency of two input audio signals and a fourth set of graphs 1030 illustrates amplitude of the two input audio signals. The horizontal axes of the third set of graphs 1010 represent time and the vertical axes of the third set of graphs 1010 represent frequency. The horizontal axis of the fourth set of graphs 1030 represent time and the vertical axes of the fourth set of graphs 1030 represent amplitude. The two input audio signals may include or correspond to the input audio signal 122 of FIG. 1, the input speech signal 210 of FIG. 2, the input speech stream 302 of FIG. 3, the input speech signal 412 of FIG. 4A, or the input speech signal 452 of FIG. 4B. In a particular implementation, the two input audio signals are filtered audio signals (e.g., audio signals that have undergone noise reduction). Alternatively, the two input audio signals may be unfiltered.

To illustrate a particular example, the two input audio signals include "robustness" speech (e.g., speech designed to test the robustness of the residual network 900), the fifth input audio signal is associated with a sound pressure level of −28.55 dB, and the sixth input audio signal is associated with a sound pressure level of −34.40 dB. Using the residual network 900, pitch detection performed on both input audio signals to determine pitch characteristics of the input audio signals. The pitch characteristics may be associated with one or more parameters that are used to generate synthesized speech, as described with reference to FIGS. 1-6.

Figure 11:
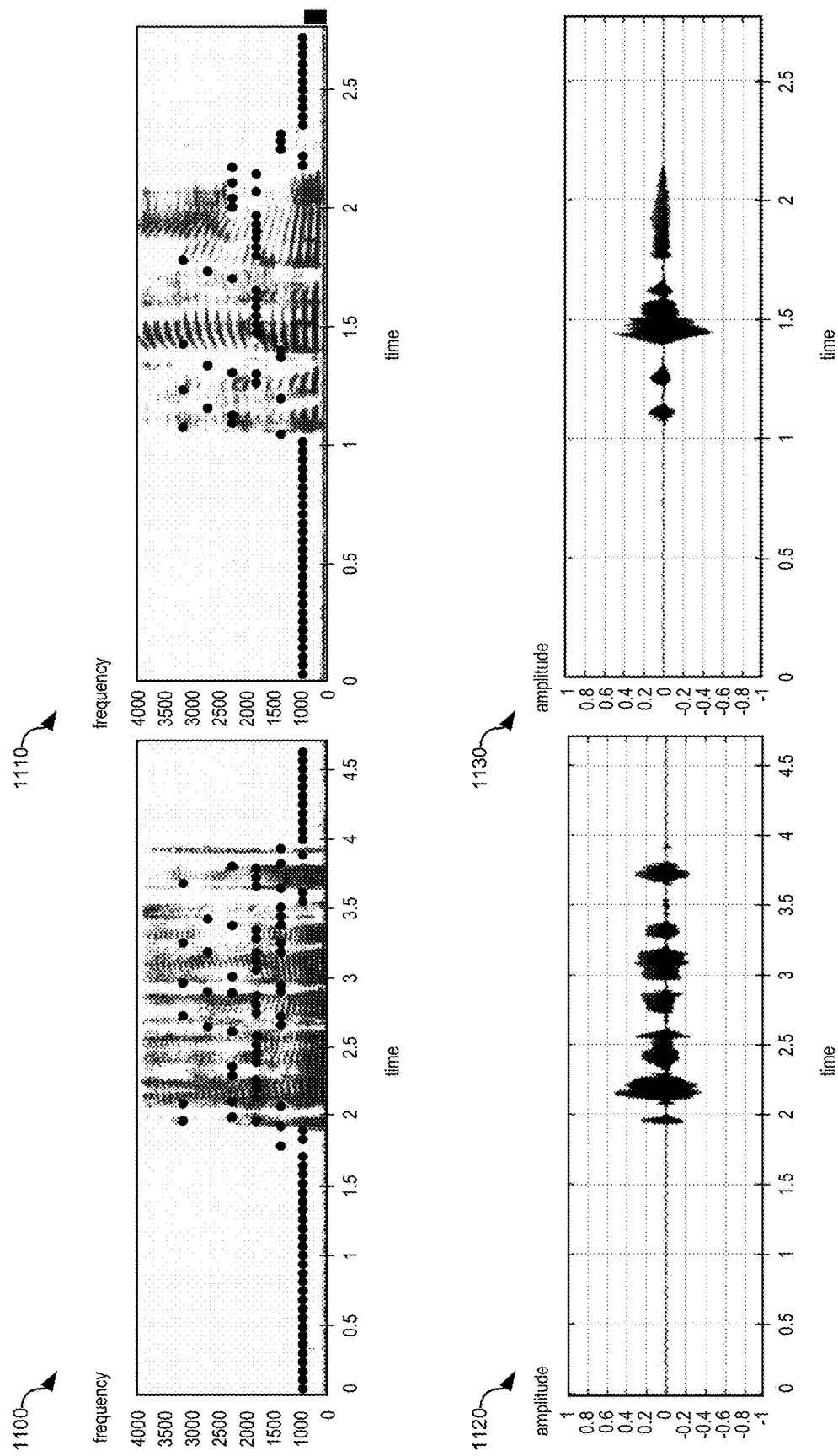
FIG. 11 illustrates examples of speech state detection based on amplitude and frequency characteristics of an input audio signal.

FIG. 11 illustrates examples of speech state detection based on amplitude and frequency characteristics of an input audio signal. A first graph 1100 illustrates frequency of a first input audio signal, a second graph 1120 illustrates amplitude of the first input audio signal, a third graph 1110 illustrates frequency of a second input audio signal, and a fourth graph 1130 illustrates amplitude of the second input audio signal. The horizontal axes of the first graph 1100 and the second graph 1120 represent time and the vertical axes of the first graph 1100 and the second graph 1120 represent frequency. The horizontal axes of the third graph 1110 and the fourth graph 1130 represent time and the vertical axes of the third graph 1110 and the fourth graph 1130 represent frequency. The input audio signals may include or correspond to the input audio signal 122 of FIG. 1, the input speech signal 210 of FIG. 2, the input speech stream 302 of FIG. 3, the input speech signal 412 of FIG. 4A, or the input speech signal 452 of FIG. 4B. In a particular implementation, the input audio signals are filtered audio signals (e.g., audio signals that have undergone noise reduction). Alternatively, the input audio signals may be unfiltered.

Speech state tracking using a LSTM-RNN may be performed on the first input audio signal and the second audio signal to estimate speech states for use in generating one or more parameters. In a particular implementation, the speech states may be associated with an EVRC speech codec, and the speech states may include silence, unvoiced, voiced, transient, down-transient, and up-transient. The speech states may be determined based on the amplitude and frequency characteristics of the input audio signals. For example, frames of the first input audio signal that are associated with high amplitude or high frequency may correspond to the voiced state, and frames that are associated with low amplitude or low frequency may be associated with the unvoiced state. The estimated speech states may be used to generate one or more parameters that are used in the generation of synthesized speech frames.

Figure 12:
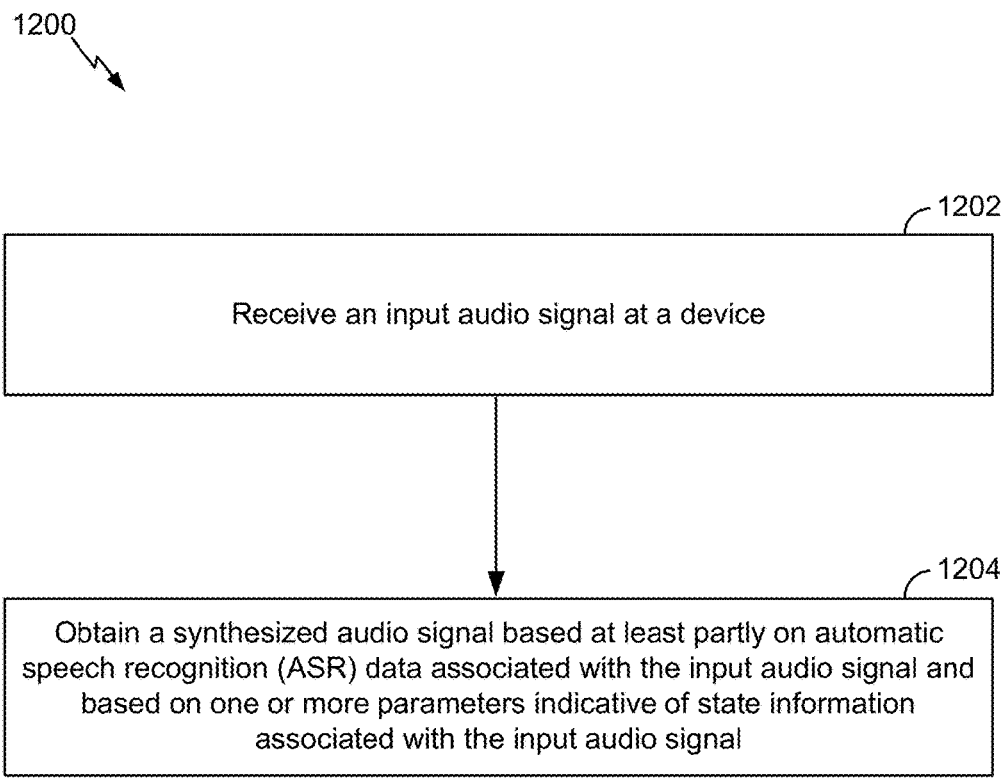
FIG. 12 is a flow chart that illustrates an illustrative method of generating a synthesized audio signal.

Referring to FIG. 12, a flow chart of an illustrative method of generating a synthesized audio signal is shown and generally designated 1200. In a particular implementation, the method 1200 may be performed by the system 100 (or components thereof) of FIG. 1, the output speech selector system 200 (or components thereof) of FIG. 2, the system 400 (or components thereof) of FIG. 4A, the system 430 (or components thereof) of FIG. 4B, the speech generative network (or components thereof), or a combination thereof.

The method 1200 includes receiving an input audio signal at a device, at 1202. For example, the audio may include the input audio signal 122 of FIG. 1. The method 1200 further includes obtaining a synthesized audio signal based at least partly on ASR data associated with the input audio signal and based on one or more parameters indicative of state information associated with the input audio signal, at 1204. For example, the synthesized audio signal may include or correspond to the synthesized audio signal 140 of FIG. 1 or the synthesized speech signal 224 of FIG. 2, the ASR data may include or correspond to the ASR data 134 the ASR data 220 of FIG. 2, and the one or more parameters may include or correspond to one or more parameters 132 of FIG. 1, the one or more parameters 214 of FIG. 2, the one or more parameters 414 of FIG. 4A, or the one or more parameters 454 of FIG. 4B.

In a particular implementation, obtaining the synthesized audio signal includes generating the synthesized audio signal based on the ASR data and the one or more parameters. Obtaining the synthesized audio signal may be performed at a device, such as a mobile device. For example, the synthesized audio signal may be generated by the speech generative circuitry 112 of FIG. 1, the speech generative circuitry 206 of FIG. 2, the speech recognition and generative circuitry 408 of FIG. 4A, or the speech generative system 600 of FIG. 6. Alternatively, the method 1200 may include transmitting the input audio signal to one or more devices via a network. The ASR data, the synthesized audio signal, or both, may be received from the one or more devices. To illustrate, the input audio signal may include or correspond to the input speech signal 452 of FIG. 4B, the ASR data may include or correspond to the ASR data 456 of FIG. 4B (which may be received from the second device 438 of FIG. 4B), and the synthesized audio signal may include or correspond to the synthesized speech signal 458 of FIG. 4B (which may be received from the second device 438).

In another particular implementation, the method 1200 includes performing non-linear, model-based speech analysis on the input audio signal to generate the one or more parameters. For example, the non-linear, model-based analysis may be performed by the speech state estimation circuitry 106 of FIG. 1, the speech state estimation circuitry 212 of FIG. 2, the speech state estimation circuitry 406 of FIG. 4A, or the speech state estimation circuitry 436 of FIG. 4B. The one or more parameters may include or correspond to speech state parameters, temporal parameters, emotional cue parameters, or a combination thereof.

In another particular implementation, the method 1200 includes performing a filtering operation on the input audio signal to generate a filtered audio signal. For example, the filtered audio signal may include or correspond to the filtered audio signal 130 of FIG. 1 or the filtered speech signal 216 of FIG. 2. The method 1200 further includes outputting an enhanced speech signal based in part of a confidence score associated with the ASR data and a similarity score that indicates a similarity between the filtered audio signal and the synthesized audio signal. For example, the enhanced speech signal may include or correspond to the enhanced speech signal 124 of FIG. 1 or the enhanced speech signal 226 of FIG. 2, the confidence score may include or correspond to the confidence score 136 of FIG. 1 or the first confidence score 222 of FIG. 2, and the similarity score may include or correspond to the similarity score 152 of FIG. 1 or the second confidence score 223 of FIG. 2. The enhanced speech signal may be selected from the filtered audio signal and the synthesized audio signal.

The synthesized audio signal may be selected as the enhanced speech signal responsive to the confidence score exceeding a first threshold, the similarity score exceeding a second threshold, and a first quality score associated with the synthesized audio signal exceeding a second quality score associated with the filtered audio signal. Additionally or alternatively, the filtered audio signal may be selected as the enhanced speech signal responsive to the confidence score exceeding a first threshold, the similarity score exceeding a second threshold, and a first quality score associated with the synthesized audio signal failing to exceed a second quality score associated with the filtered audio signal. Additionally or alternatively, the filtered audio signal may be selected as the enhanced speech signal responsive to the confidence score failing to exceed a first threshold. Additionally or alternatively, the filtered audio signal may be selected as the enhanced speech signal responsive to the confidence score exceeding a first threshold and the similarity score failing to exceed a second threshold.

Thus, the method 1200 of FIG. 12 may generate a synthesized audio signal that more closely matches user speech at a particular time. To illustrate, because the synthesized audio signal is based on the one or more parameters (that are generated based on input speech at a particular time), the synthesized audio signal represents speech that may sound more like input speech at the particular time. For example, the synthesized speech may have characteristics (e.g., pitch, modulation, energy level, envelope, emotional cues, etc.) that more closely match characteristics the input speech at the particular time than synthesized speech that is generated using other methods. Improving the similarity between the synthesized speech and the input speech may improve user experience.

Figure 13:
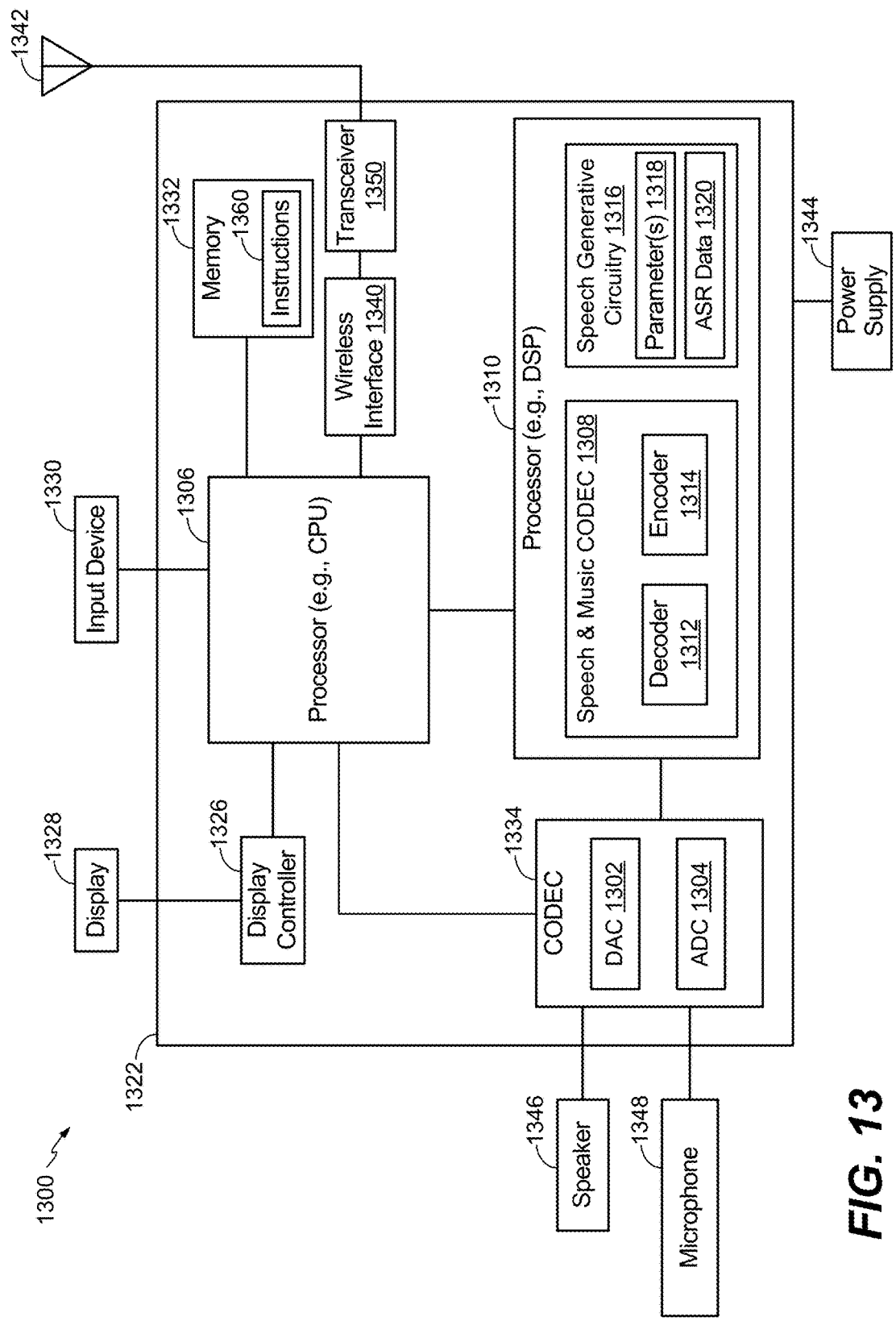
FIG. 13 is a block diagram of a wireless device that generates a synthesized audio signal.

Referring to FIG. 13, a block diagram of a particular illustrative implementation of a device (e.g., a wireless communication device) is depicted and generally designated 1300. In various implementations, the device 1300 may have more or fewer components than illustrated in FIG. 13. In an illustrative implementation, the device 1300 may include or correspond to the system 100 of FIG. 1, the output speech selector system 200 of FIG. 2, the device 402 of FIG. 4A, the first device 432 of FIG. 4B, or a combination thereof.

In a particular implementation, the device 1300 includes a processor 1306, such as a central processing unit (CPU), coupled to a memory 1332. The memory 1332 includes instructions 1360 (e.g., executable instructions) such as computer-readable instructions or processor-readable instructions. The instructions 1360 may include one or more instructions that are executable by a computer, such as the processor 1306. The device 1300 may include one or more additional processors 1310 (e.g., one or more digital signal processors (DSPs)). The processors 1310 may include a speech and music coder-decoder (CODEC) 1308. The speech and music CODEC 1308 may include a vocoder encoder 1314, a vocoder decoder 1312, or both. In a particular implementation, the speech and music CODEC 1308 may be an enhanced voice services (EVS) CODEC that communicates in accordance with one or more standards or protocols, such as a 3rd Generation Partnership Project (3GPP) EVS protocol.

The processors 1310 may also include speech generative circuitry 1316 that is configured to generate a synthesized audio signal based on ASR data 1320 and one or more parameters 1318. The ASR data 1320 may be associated with the input audio signal and may represent a transcript of speech in the input audio signal. For example, the ASR data 1320 may include or correspond to the ASR data 134 of FIG. 1. The one or more parameters 1318 may indicate state information associated with the input audio signal. For example, the one or more parameters 1318 may include or correspond to the one or more parameters 132 of FIG. 1. The one or more parameters 1318 and the ASR data 1320 may be used by the speech generative circuitry 1316 during operation and may be stored at the memory 1332.

FIG. 13 also illustrates that a wireless interface 1340, such as a wireless controller, and a transceiver 1350 may be coupled to the processor 1306 and to an antenna 1342, such that wireless data received via the antenna 1342, the transceiver 1350, and the wireless interface 1340 may be provided to the processor 1306 and the processors 1310. In other implementations, a transmitter and a receiver may be coupled to the processor 1306 and to the antenna 1342.

The device 1300 may include a display controller 1326 that is coupled to the processor 1306 and to a display 1328. A coder/decoder (CODEC) 1334 may also be coupled to the processor 1306 and the processors 1310. A speaker 1346 and a microphone 1348 may be coupled to the CODEC 1334. The CODEC 1334 may include a DAC 1302 and an ADC 1304. In a particular implementation, the CODEC 1334 may receive analog signals from the microphone 1348, convert the analog signals to digital signals using the ADC 1304, and provide the digital signals to the speech and music CODEC 1308. The speech and music CODEC 1308 may process the digital signals. In a particular implementation, the speech and music CODEC 1308 may provide digital signals to the CODEC 1334. The CODEC 1334 may convert the digital signals to analog signals using the DAC 1302 and may provide the analog signals to the speaker 1346.

In some implementations, the processor 1306, the processors 1310, the display controller 1326, the memory 1332, the CODEC 1334, the wireless interface 1340, and the transceiver 1350 are included in a system-in-package or system-on-chip device 1322. In some implementations, an input device 1330 and a power supply 1344 are coupled to the system-on-chip device 1322. Moreover, in a particular implementation, as illustrated in FIG. 13, the display 1328, the input device 1330, the speaker 1346, the microphone 1348, the antenna 1342, and the power supply 1344 are external to the system-on-chip device 1322. In a particular implementation, each of the display 1328, the input device 1330, the speaker 1346, the microphone 1348, the antenna 1342, and the power supply 1344 may be coupled to a component of the system-on-chip device 1322, such as an interface or a controller.

The device 1300 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof.

In a particular implementation, the device 1300 includes an audio sensor (e.g., the microphone 1348) that is configured to receive an input audio signal, such as the input audio signal 122 of FIG. 1. The device 1300 also includes the speech generative circuitry 1316 that is configured to generate a synthesized audio signal based on the ASR data 1320 and the one or more parameters 1318 that are indicative of state information associated with the input audio signal.

In an illustrative implementation, the memory 1332 includes or stores the instructions 1360 (e.g., executable instructions), such as computer-readable instructions or processor-readable instructions. For example, the memory 1332 may include or correspond to a non-transitory computer readable medium storing the instructions 1360. The instructions 1360 may include one or more instructions that are executable by a computer, such as the processor 1306 or the processors 1310. The instructions 1360 may cause the processor 1306 or the processors 1310 to perform the method 1200 of FIG. 12.

In a particular implementation, the instructions 1360, when executed by the processor 1306 or the processors 1310, may cause the processor 1306 or the processors 1310 to receive an input audio signal at the device 1300. For example, the input audio signal may be received via the microphone 1348. The instructions 1360 may also cause the processor 1306 or the processors 1310 to obtain a synthesized audio signal based on the ASR data 1320 and based on the one or more parameters 1318 that are indicative of state information associated with the input audio signal.

In conjunction with the described aspects, an apparatus includes means for receiving an input audio signal. The means for receiving may include or correspond to audio sensor 102 of FIG. 1, the microphone 404 of FIG. 4A, the microphone 434 of FIG. 4B, the microphone 1348 of FIG. 13, one or more other structures or circuits configured to receive the input audio signal, or any combination thereof.

The apparatus further includes means for generating a synthesized audio signal based on ASR data associated with the input audio signal and based on one or more parameters indicative of state information associated with the input audio signal. The means for generating may include or correspond to the speech generative circuitry 112 or the speech processing circuitry 104 of FIG. 1, the speech generative circuitry 206 of FIG. 2, the speech recognition and generative circuitry 408 of FIG. 4A, the speech generative system 600 of FIG. 6, the speech generative circuitry 1316, the processor 1306, the processors 1310 of FIG. 13, one or more other structures or circuits configured to generate the synthesized audio signal, or any combination thereof.

In a particular implementation, the apparatus includes means for generating the one or more parameters based on estimated speech states of the input audio signal and means for generating the ASR data based on the input audio signal. The ASR data may indicate a transcript of input speech associated with the input audio signal. The means for generating the one or more parameters may include or correspond to the speech state estimation circuitry 106 of FIG. 1, the speech state estimation circuitry 212 or the filtering circuitry 202 of FIG. 2, the speech state estimation circuitry 406 of FIG. 4A, the processor 1306 or the processors 1310 of FIG. 13, one or more other structures or circuits configured to generate one or more parameters based on estimated speech states, or any combination thereof. The means for generating the ASR data may include or correspond to the speech recognition circuitry 110 of FIG. 1, the speech recognition circuitry 204 of FIG. 2, the speech recognition and generative circuitry 408 of FIG. 4A, the processor 1306 or the processors 1310 of FIG. 13, one or more other structures or circuits configured to generate ASR data, or any combination thereof.

One or more of the disclosed aspects may be implemented in a system or an apparatus, such as the device 1300, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1300 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

While FIG. 13 illustrates a wireless communication device including the speech generative circuitry 1316, speech generative circuitry may be included in various other electronic devices. For example, the speech generative circuitry 112 (or the speech processing circuitry 104), the speech generative circuitry 206 (or the output speech selector system 200), the speech recognition and generative circuitry 408, and the speech generative system 600 described with references to FIGS. 1, 2, 4A, and 6, respectively, may be included in one or more components of a base station.

A base station may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA.

Various functions may be performed by one or more components of the base station, such as sending and receiving messages and data (e.g., audio data). The one or more components of the base station may include a processor (e.g., a CPU), a transcoder, a memory, a network connection, a media gateway, a demodulator, a transmission data processor, a receiver data processor, a transmission multiple input-multiple output (MIMO) processor, transmitters and receivers (e.g., transceivers), an array of antennas, or a combination thereof. The base station, or one or more of the components of the base station, may include speech generative circuitry configured to generate a synthesized audio signal based on ASR data and one or more parameters indicative of state information of an input audio signal, as described above with reference to FIGS. 1-6.

During operation of a base station, one or more antennas of the base station may receive a data stream from a wireless device. A transceiver may receive the data stream from the one or more antennas and may provide the data stream to the demodulator. The demodulator may demodulate modulated signals of the data stream and provide demodulated data to the receiver data processor. The receiver data processor may extract audio data from the demodulated data and provide the extracted audio data to the processor. In a particular implementation, the base station may generate a synthesized audio signal based on ASR data associated with the extracted audio data and one or more parameters indicative of state information associated with the input audio signal.

The processor may provide the audio data to the transcoder for transcoding. The decoder of the transcoder may decode the audio data from a first format into decoded audio data and the encoder may encode the decoded audio data into a second format. In some implementations, the encoder may encode the audio data using a higher data rate (e.g., upconvert) or a lower data rate (e.g., downconvert) than received from the wireless device. In other implementations the audio data may not be transcoded. Transcoding operations (e.g., decoding and encoding) may be performed by multiple components of the base station. For example, decoding may be performed by the receiver data processor and encoding may be performed by the transmission data processor. In other implementations, the processor may provide the audio data to the media gateway for conversion to another transmission protocol, coding scheme, or both. The media gateway may provide the converted data to another base station or core network via the network connection.

Although one or more of FIGS. 1-13 may illustrate systems, apparatuses, and/or methods according to the teachings of the disclosure, the disclosure is not limited to these illustrated systems, apparatuses, and/or methods. One or more functions or components of any of FIGS. 1-13 as illustrated or described herein may be combined with one or more other portions of another of FIGS. 1-13. For example, one or more elements of the method 1200 of FIG. 12 may be performed in combination with other operations described herein. Accordingly, no single implementation described herein should be construed as limiting and implementations of the disclosure may be suitably combined without departing form the teachings of the disclosure. As an example, one or more operations described with reference to FIG. 12 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
   an audio sensor coupled to an electronic device, the audio sensor configured to receive an input audio signal; and
   speech generative circuitry included in the electronic device, the speech generative circuitry configured to generate a synthesized audio signal based at least partly on automatic speech recognition (ASR) data associated with the input audio signal and based on one or more parameters indicative of state information associated with the input audio signal.

2. The apparatus of claim 1, wherein the speech generative circuitry includes one or more neural networks configured to generate the synthesized audio signal based on the ASR data and the one or more parameters.

3. The apparatus of claim 2, wherein the synthesized audio signal is generated based further on training data associated with a user, one or more previous synthesized audio frames, or a combination thereof, and wherein the training data is distinct from the one or more parameters.

4. The apparatus of claim 1, further comprising speech state estimation circuitry configured to generate the one or more parameters based on at least a portion of the input audio signal.

5. The apparatus of claim 1, wherein the one or more parameters include speech state parameters indicative of whether one or more portions of the input audio signal correspond to speech or non-speech, energy levels associated with the input audio signal, or a combination thereof.

6. The apparatus of claim 1, wherein the one or more parameters include temporal parameters indicative of a tempo associated with speech represented by the input audio signal, accented sounds associated with the speech, or a combination thereof.

7. The apparatus of claim 1, wherein the one or more parameters include emotional cue parameters indicative of emotional levels associated with speech represented by the input audio signal, modulation levels associated with the speech, or a combination thereof.

8. The apparatus of claim 1, wherein the one or more parameters include pitch parameters indicative of pitch associated with speech represented by the input audio signal.

9. The apparatus of claim 1, further comprising speech recognition circuitry configured to perform one or more ASR operations based on the input audio signal to generate the ASR data, the ASR data indicating a transcript of input speech associated with the input audio signal.

10. The apparatus of claim 1, further comprising filtering circuitry configured to perform model-based audio filtering based on the input audio signal to generate a filtered audio signal.

11. The apparatus of claim 10, wherein the filtering circuitry comprises speech state estimation circuitry configured to generate the one or more parameters based on at least a portion of the input audio signal.

12. The apparatus of claim 10, further comprising speech recognition circuitry configured to perform one or more ASR operations based on the filtered audio signal to generate the ASR data, the ASR data indicating a transcript of input speech associated with the input audio signal.

13. The apparatus of claim 10, further comprising output selection circuitry configured to:
select an audio signal from the filtered audio signal and the synthesized audio signal, the selection based at least in part on a confidence score associated with the ASR date, a similarity score that indicates a similarity between the filtered audio signal and the synthesized audio signal based on the selected audio signal.

14. The apparatus of claim 13, wherein the selection is further based on a first quality score associated with the filtered audio signal and a second quality score associated with the synthesized audio signal.

15. The apparatus of claim 13, wherein the output selection circuitry is further configured to initiate output of the enhanced speech signal at a speaker.

16. The apparatus of claim 1, further comprising:
an antenna; and
a transmitter configured to transmit the synthesized audio signal, wherein the audio sensor, the speech generative circuitry, the antenna, and the transmitter are integrated into a mobile device.

17. A method comprising:
receiving an input audio signal at an electronic device; and
obtaining, at the electronic device, a synthesized audio signal based at least partly on automatic speech recognition (ASR) data associated with the input audio signal and based on one or more parameters indicative of state information associated with the input audio signal.

18. The method of claim 17, wherein obtaining the synthesized audio signal comprises generating the synthesized audio signal based on the ASR data and the one or more parameters.

19. The method of claim 17, further comprising transmitting the input audio signal to one or more devices via a network, wherein the ASR data, the synthesized audio signal, or both are received from the one or more devices.

20. The method of claim 17, further comprising performing non-linear, model-based speech analysis on the input audio signal to generate the one or more parameters, wherein the one or more parameters comprise speech state parameters, temporal parameters, emotional cue parameters, pitch parameters, or a combination thereof.

21. The method of claim 17, further comprising:
performing a filtering operation on the input audio signal to generate a filtered audio signal; and
outputting an enhanced speech signal based in part of a confidence score associated with the ASR data and a similarity score that indicates a similarity between the filtered audio signal and the synthesized audio signal, wherein the enhanced speech signal is selected from the filtered audio signal and the synthesized audio signal.

22. The method of claim 21, wherein the synthesized audio signal is selected as the enhanced speech signal responsive to the confidence score exceeding a first threshold, the similarity score exceeding a second threshold, and a first quality score associated with the synthesized audio signal exceeding a second quality score associated with the filtered audio signal.

23. The method of claim 21, wherein the filtered audio signal is selected as the enhanced speech signal responsive to the confidence score exceeding a first threshold, the similarity score exceeding a second threshold, and a first quality score associated with the synthesized audio signal failing to exceed a second quality score associated with the filtered audio signal.

24. The method of claim 21, wherein the filtered audio signal is selected as the enhanced speech signal responsive to the confidence score failing to exceed a first threshold.

25. The method of claim 21, wherein the filtered audio signal is selected as the enhanced speech signal responsive to the confidence score exceeding a first threshold and the similarity score failing to exceed a second threshold.

26. The method of claim 17, wherein obtaining the synthesized audio signal is performed at a mobile device.

27. An apparatus comprising:
means for receiving an input audio signal at an electronic device; and
means for generating, at the electronic device, a synthesized audio signal based at least partly on automatic speech recognition (ASR) data associated with the input audio signal and based on one or more parameters indicative of state information associated with the input audio signal.

28. The apparatus of claim 27, further comprising:
means for generating the one or more parameters based on estimated speech states of the input audio signal; and
means for generating the ASR data based on the input audio signal, the ASR data indicating a transcript of input speech associated with the input audio signal.

29. A non-transitory, computer readable medium that includes instructions that, when executed by a processor, cause the processor to perform operations comprising:
receiving an input audio signal at an electronic device; and
obtaining, at the electronic device, a synthesized audio signal based at least partly on automatic speech recognition (ASR) data associated with the input audio signal and based on one or more parameters indicative of state information associated with the input audio signal.

30. The non-transitory, computer readable medium of claim 29, wherein the operations further comprise performing non-linear, model-based analysis on the input audio signal to generate the one or more parameters, wherein the one or more parameters are not based on training data associated with a user of the electronic device.

\* \* \* \* \*